United States Patent
Maeda et al.

(10) Patent No.: US 9,745,470 B2
(45) Date of Patent: Aug. 29, 2017

(54) FILM-FORMING COMPOSITION

(71) Applicant: NISSAN CHEMICAL INDUSTRIES, LTD., Tokyo (JP)

(72) Inventors: Daisuke Maeda, Funabashi (JP); Naoya Nishimura, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 1 day.

(21) Appl. No.: 14/772,583

(22) PCT Filed: Mar. 6, 2014

(86) PCT No.: PCT/JP2014/055760
§ 371 (c)(1),
(2) Date: Sep. 3, 2015

(87) PCT Pub. No.: WO2014/136871
PCT Pub. Date: Sep. 12, 2014

(65) Prior Publication Data
US 2016/0017145 A1    Jan. 21, 2016

(30) Foreign Application Priority Data

Mar. 8, 2013  (JP) .................................. 2013-046720
Mar. 18, 2013 (JP) .................................. 2013-054892

(51) Int. Cl.
| | |
|---|---|
| C08L 77/00 | (2006.01) |
| C08L 77/10 | (2006.01) |
| C09D 179/04 | (2006.01) |
| C09D 179/02 | (2006.01) |
| C08G 73/02 | (2006.01) |
| C08G 73/06 | (2006.01) |
| C09D 177/06 | (2006.01) |
| C09D 177/10 | (2006.01) |

(52) U.S. Cl.
CPC ............ *C08L 77/10* (2013.01); *C08G 73/028* (2013.01); *C08G 73/0273* (2013.01); *C08G 73/0644* (2013.01); *C09D 177/06* (2013.01); *C09D 177/10* (2013.01); *C09D 179/02* (2013.01); *C09D 179/04* (2013.01); *C08L 2201/02* (2013.01); *C08L 2201/10* (2013.01); *C08L 2203/16* (2013.01)

(58) Field of Classification Search
None
See application file for complete search history.

(56) References Cited

U.S. PATENT DOCUMENTS

| | | |
|---|---|---|
| 8,618,243 B2 | 12/2013 | Nishimura et al. |
| 8,710,174 B2 | 4/2014 | Nishimura et al. |
| 2013/0324634 A1 | 12/2013 | Nishimura et al. |

FOREIGN PATENT DOCUMENTS

| | | |
|---|---|---|
| WO | WO 2010/128661 A1 | 11/2010 |
| WO | WO 2012/111682 A1 | 8/2012 |
| WO | WO 2012/115216 A1 | 8/2012 |

OTHER PUBLICATIONS

International Search Report, issued in PCT/JP2014/055760, dated Jun. 10, 2014.
Written Opinion of the International Searching Authority, issued in PCT/JP2014/055760, dated Jun. 10, 2014.

*Primary Examiner* — Ana Woodward
(74) *Attorney, Agent, or Firm* — Birch, Stewart, Kolasch & Birch, LLP

(57) ABSTRACT

A film-forming composition that contains a tricarbonyl-benzene hyperbranched-polymer cross-linker and a triazine-containing hyperbranch, as shown for example in the formula, can form a thin film that excels in terms of hardness and heat tolerance and exhibits a reduced decrease in index of refraction despite the addition of the cross-linker.

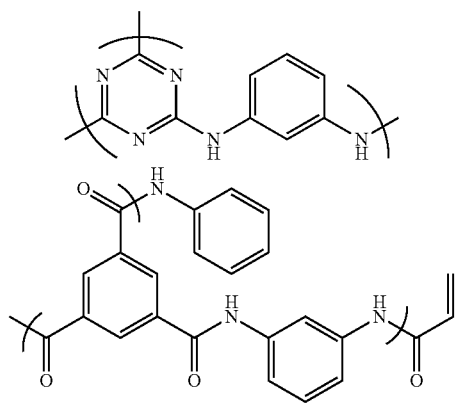

18 Claims, 3 Drawing Sheets

FILM-FORMING COMPOSITION

TECHNICAL FIELD

The present invention relates to a film-forming composition. More specifically, the invention relates to a film-forming composition containing two types of hyperbranched polymers: one that is triazine-based and another that is aromatic polyamide-based.

BACKGROUND ART

In recent years, there has arisen a need for high-performance polymeric materials in the development of electronic devices such as liquid-crystal displays, organic electroluminescence (EL) displays, touch panels, optical semiconductor devices (LEDs), solid-state image sensors, organic thin-film solar cells, dye-sensitized solar cells and organic thin-film transistors (TFTs).

The specific properties desired in such polymeric materials include (1) heat resistance, (2) transparency, (3) high refractive index, (4) high solubility, (5) low volume shrinkage, (6) resistance to high temperatures and high humidity, and (7) high film hardness.

The inventors earlier discovered that hyperbranched polymers containing recurring units with a triazine ring and an aromatic ring have a high refractive index, are capable of achieving, with the polymer alone, high heat resistance, high transparency, high refractive index, high solubility and low volume shrinkage, and are thus suitable as film-forming compositions in the manufacture of electronic devices (Patent Document 1).

The inventors also earlier discovered that, when reacting a benzenetricarboxylic acid with a diamine to produce a hyperbranched aromatic polyamide, those aromatic polyamides obtained by adding a monofunctional substance capable of reacting with carboxyl groups, etc. on the benzenetricarboxylic acid so as to cap some of the reactive end groups and thereby control hyperbranching have a good solubility in organic solvents while retaining heat resistance and transparency, and thus can be advantageously used as the base polymer of film-forming compositions when producing electronic devices (Patent Document 2).

However, in both above hyperbranched polymers, to achieve a high film hardness, it is essential to increase the crosslink density by using a crosslinking agent. Unfortunately, in aromatic polyamide-based hyperbranched polymers, adding a crosslinking agent often lowers the refractive index and heat resistance. Moreover, because this polymer uses carboxyl groups bonded directly to the benzene ring as the crosslink sites, the crosslink reactivity is low and the range of choice in crosslinking agents is narrow, in addition to which the cured product has a low crosslink density and cracks sometimes arise. When the polymer is formed into a thin-film, other problems include a tendency to absorb water and inadequate alkali resistance. Depending on the intended application, improvements in these areas are sometimes desired.

And in triazine ring-containing hyperbranched polymers, adding a crosslinking agent not only lowers the refractive index, it also makes it impossible to obtain a film having the high degree of hardness that is anticipated.

PRIOR ART DOCUMENTS

Patent Documents

Patent Document 1: WO 2010/128661
Patent Document 2: WO 2012/115216

SUMMARY OF THE INVENTION

Problems to be Solved by the Invention

It is therefore an object of this invention to provide a film-forming composition that is capable of producing a thin-film in which, even when a crosslinking agent has been added, the decline in refractive index is suppressed and which moreover has an excellent hardness and heat resistance.

Means for Solving the Problems

As a result of extensive investigations, the inventors have discovered that, by using a composition which uses a triazine ring-containing hyperbranched polymer in combination with an aromatic polyamide-based hyperbranched polymer, there can be obtained a cured film in which the decline in refractive index due to addition of a crosslinking agent is suppressed and which moreover has a high film hardness and a high heat resistance.

Accordingly, the invention provides the following film-forming compositions.

1. A film-forming composition characterized by including a triazine ring-containing hyperbranched polymer which includes a recurring unit structure of formula (1) below and an aromatic polyamide-based hyperbranched polymer which includes a recurring unit structure of formula (2) below

[Chemical Formula 1]

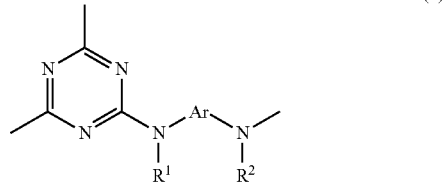

(1)

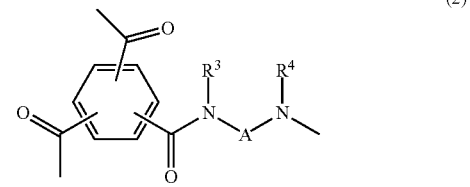

(2)

{wherein $R^1$ to $R^4$ are each independently a hydrogen atom, an alkyl group, an alkoxy group, an aryl group or an aralkyl group; Ar is at least one moiety selected from the group consisting of moieties of formulas (3) to (14); and A is at least one moiety selected from the group consisting of moieties of formulas (3) to (27)

[Chemical Formula 2]
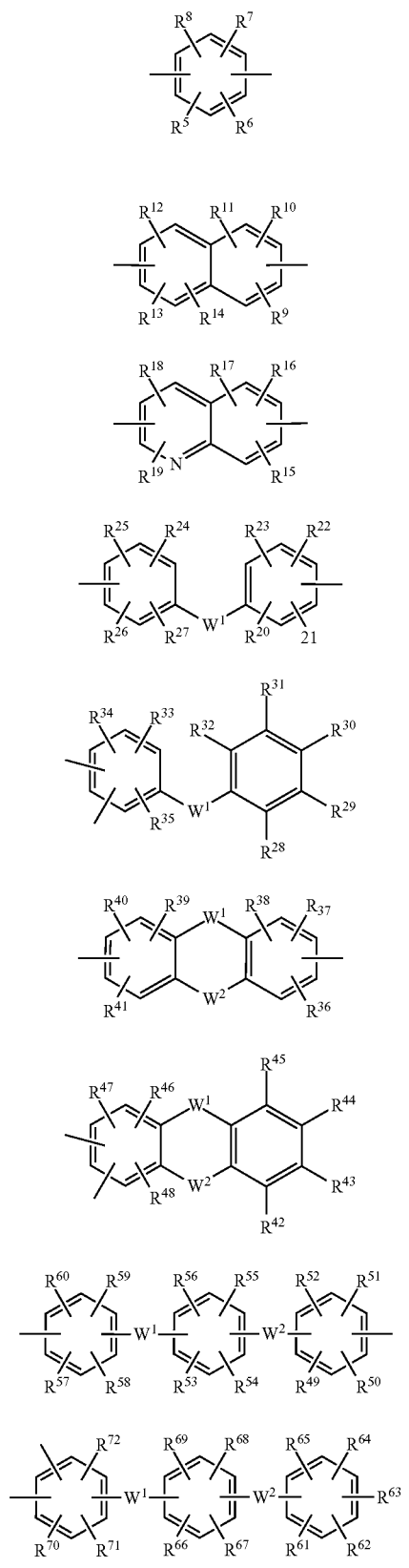

-continued

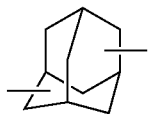
(24)

(25)

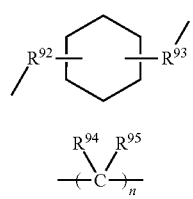
(26)

(27)

[in which $R^5$ to $R^{85}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; $R^{86}$ to $R^{93}$ are each independently an alkylene group of 1 to 10 carbons which may have a branched structure; $R^{94}$ and $R^{95}$ are each independently a hydrogen atom or an alkyl group of 1 to 10 carbons which may have a branched structure (with the proviso that $R^{94}$ and $R^{95}$ may together form a ring); $W^1$ and $W^2$ are each independently a single bond, —$(CR^{96}R^{97})_m$— ($R^{96}$ and $R^{97}$ being each independently a hydrogen atom or an alkyl group of 1 to 10 carbons which may have a branched structure (with the proviso that these may together form a ring), and m being an integer from 1 to 10), O, S, SO, $SO_2$, $NR^{98}$, C=O, C(=O)O, OC(=O), OC(=O)O, $CONR^{99}$, $NR^{100}CO$ or $NR^{101}CONR^{102}$ ($R^{98}$ to $R^{102}$ being each independently a hydrogen atom or an alkyl group of 1 to 10 carbons which may have a branched structure); $X^1$ and $X^2$ are each independently a single bond, an alkylene group of 1 to 10 carbons which may have a branched structure, or a group of formula (28)

[Chemical Formula 3]

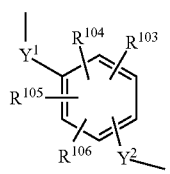
(28)

(wherein $R^{103}$ to $R^{106}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure); and n is an integer from 1 to 20]}, wherein the aromatic polyamide-based hyperbranched polymer is obtained by reacting a benzenetricarboxylic acid or a derivative thereof with a diamine compound in the presence of at least a monofunctional substance having one functional group capable of reacting with the benzenetricarboxylic acid or a derivative thereof.

2. The film-forming composition according to 1 above, wherein the triazine ring-containing hyperbranched polymer and the aromatic polyamide-based hyperbranched polymer are included in proportions of, expressed as the weight ratio (triazine ring-containing hyperbranched polymer):(aromatic polyamide-based hyperbranched polymer), of from 2:8 to 4:6.

3. The film-forming composition according to 1 or 2 above, wherein a benzenetricarboxylic acid end or a diamine end of the aromatic polyamide-based hyperbranched polymer is capped with an end-capping compound having a crosslinkable group.

4. The film-forming composition according to 3 above, wherein the aromatic polyamide-based hyperbranched polymer is obtained by reacting a benzenetricarboxylic acid or a derivative thereof with a diamine compound in the presence of a monofunctional substance having one functional group capable of reacting with the benzenetricarboxylic acid or a derivative thereof, and by additional reaction in the presence of an end-capping compound having a functional group capable of reacting with an end that originates from the diamine and having also a crosslinkable group.

5. The film-forming composition according to 4 above, wherein the end-capping compound is a compound having a carboxyl group or a derivative group thereof and a carbon-carbon double bond.

6. The film-forming composition according to 5 above, wherein the end-capping compound is (meth)acrylic acid or a derivative thereof.

7. The film-forming composition according to any one of 1 to 6 above, wherein the monofunctional substance is aniline, phenol or methanol.

8. The film-forming composition according to any one of 1 to 7 above, wherein Ar is at least one moiety selected from the group consisting of moieties of formulas (3), (6), (8), (9) and (12).

9. The film-forming composition according to any one of 1 to 8 above, wherein A is at least one moiety selected from the group consisting of moieties of formulas (3), (6), (7), (8), (12), (14) and (27).

10. The film-forming composition according to any one of 1 to 9 above which further includes a crosslinking agent.

11. The film-forming composition according to 10 above, wherein the crosslinking agent is a compound having a (meth)acryl group.

12. The film-forming composition according to 11 above, wherein the crosslinking agent is a polyfunctional (meth)acrylate compound.

13. The film-forming composition according to 10 above, wherein the crosslinking agent is an aminoplast compound.

14. A cured film obtained by curing the film-forming composition according to any one of 1 to 13 above.

15. A functional film that includes a base material and the cured film of 14 above formed on the base material.

16. An electronic device that includes a base material and the cured film of 14 above formed on the base material.

17. An optical member that includes a base material and the cured film of 14 above formed on the base material.

Advantageous Effects of the Invention

Because the film-forming composition of the invention includes a specific triazine ring-containing hyperbranched polymer and a specified aromatic polyamide-based hyperbranched polymer, it is possible to produce from this a thin-film which not only has the characteristics of a high heat resistance, high transparency, high refractive index, high solubility and low volume shrinkage, but also, owing to synergistic effects of both polymers, such as entanglement of the polymer chains, has a higher hardness than a film made of only one of these polymers while at the same time maintaining a high refractive index of 1.7 or more.

Also, by using the film-forming composition of the invention, a cured film can be formed which has an excellent heat resistance, which does not give rise to cracking even when the composition is produced as a thick-film, and moreover which has excellent acid and alkali resistance.

Films having such properties that are produced from the film-forming compositions of the invention can be advantageously used as a component in the fabrication of electronic devices such as liquid-crystal displays, organic EL displays, touch panels, LEDs, solid-state image sensors, organic thin-film solar cells, dye-sensitized solar cells and organic thin-film transistors; and in optical information recording media such as holograms and Blu-ray discs. In particular, such films can be advantageously used as refractive index adjusting layers in organic EL displays, LED displays and touch panels required to have a higher refractive index. Aside from electronic material applications, use as high-functionality films required to have a high refractive index is also possible.

BRIEF DESCRIPTION OF THE DIAGRAMS

EMBODIMENT FOR CARRYING OUT THE INVENTION

Figure 1:
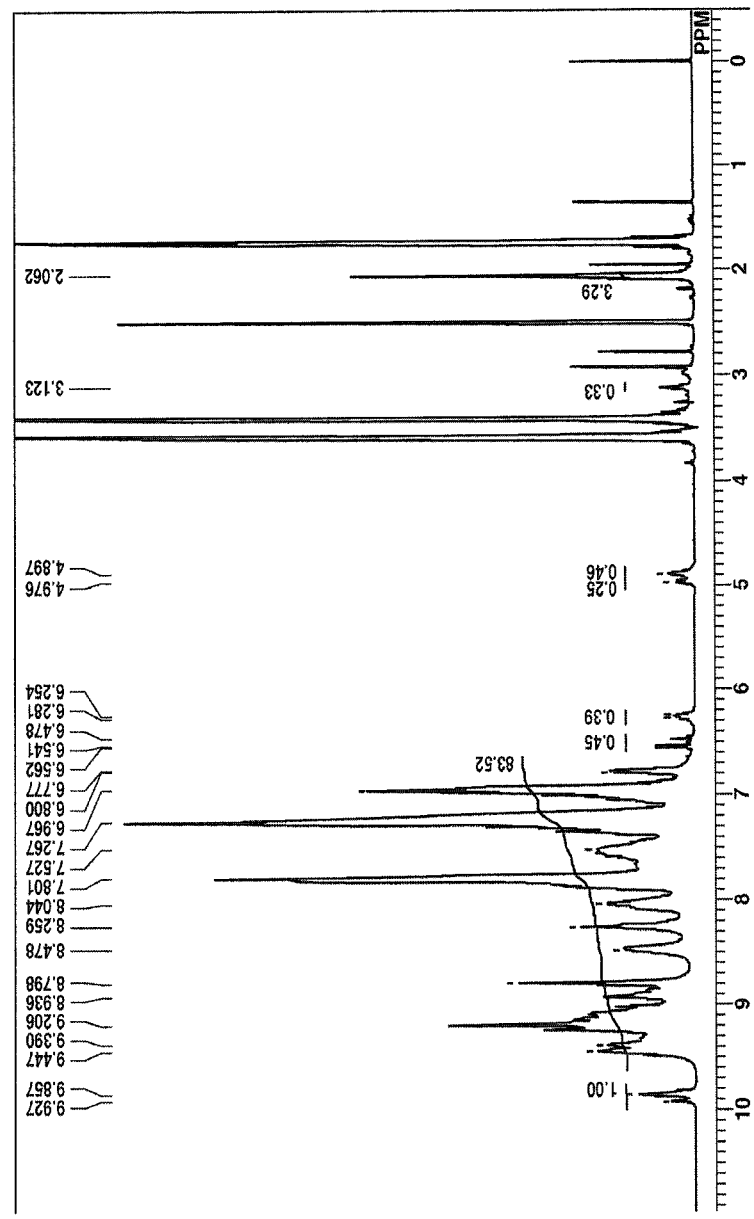
FIG. 1 is an $^1$H-NMR spectrum of the triazine ring-containing hyperbranched polymer obtained in Synthesis Example 1.

The invention is described more fully below.

The film-forming composition according to this invention includes a triazine ring-containing hyperbranched polymer which includes a recurring unit structure of formula (1) below and an aromatic polyamide-based hyperbranched polymer which includes a recurring unit structure of formula (2) below, wherein the aromatic polyamide-based hyperbranched polymer is obtained by reacting a benzenetricarboxylic acid or a derivative thereof with a diamine compound in the presence of at least a monofunctional substance having one functional group capable of reacting with the benzenetricarboxylic acid or a derivative thereof.

[Chemical Formula 4]

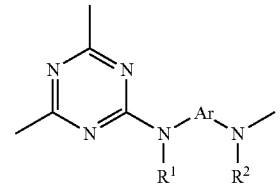

(1)

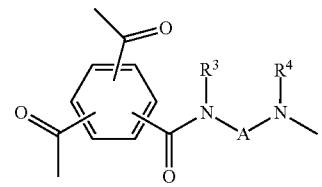

(2)

In these formulas, $R^1$ to $R^4$ are each independently a hydrogen atom, an alkyl group, an alkoxy group, an aryl group or an aralkyl group.

In this invention, the number of carbons on the alkyl group is not particularly limited, although from 1 to 20 carbons is preferred. To further increase the heat resistance of the polymer, from 1 to 10 carbons is more preferred, and from 1 to 3 carbons is still more preferred. The structure may be linear, branched or cyclic.

Illustrative examples of the alkyl group include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl groups.

The number of carbons on the alkoxy group is not particularly limited, although from 1 to 20 carbons is preferred. To further increase the heat resistance of the polymer, from 1 to 10 carbons is more preferred, and from 1 to 3 carbons is still more preferred. The structure of the alkyl moiety may be linear, branched or cyclic.

Illustrative examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy groups.

The number of carbons on the aryl group is not particularly limited, although from 6 to 40 is preferred. To further increase the heat resistance of the polymer, from 6 to 16 carbons is more preferred, and from 6 to 13 carbons is still more preferred.

Illustrative examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

The number of carbons on the aralkyl group is not particularly limited, although from 7 to 20 carbons is preferred. The alkyl moiety may be linear, branched or cyclic.

Illustrative examples of the aralkyl group include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

Ar is at least one moiety selected from the group consisting of moieties of formulas (3) to (14), and A is at least one moiety selected from the group consisting of moieties of formulas (3) to (27).

[Chemical Formula 5]

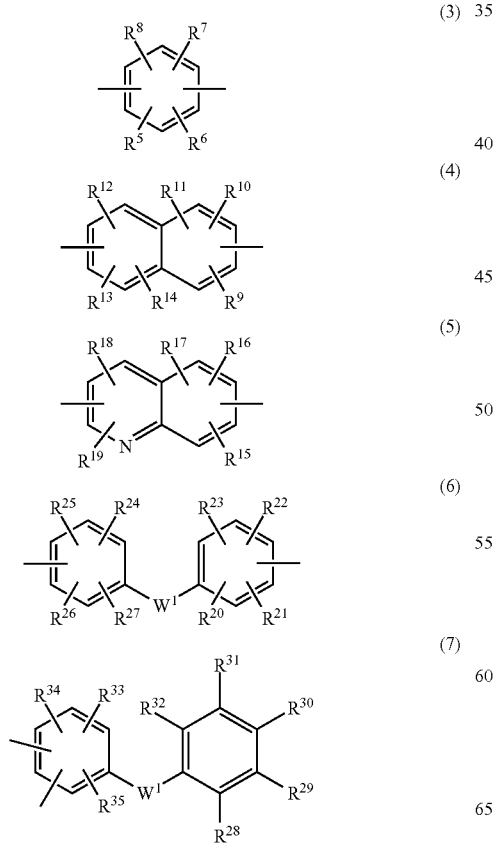

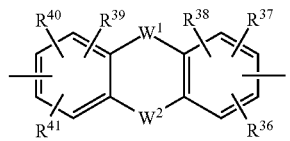

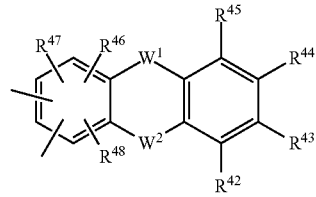

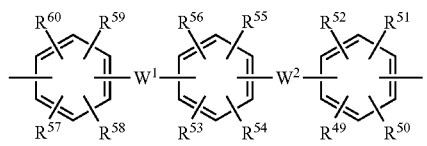

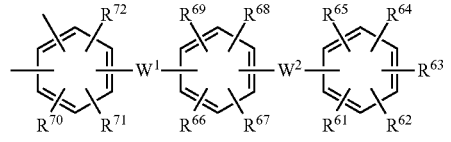

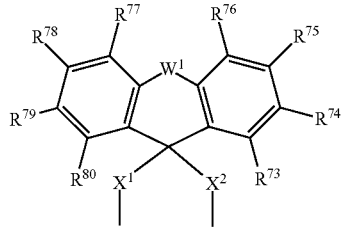

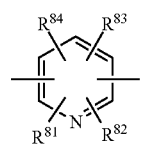

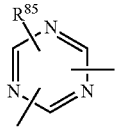

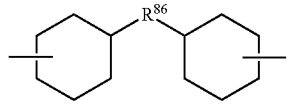

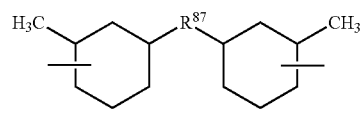

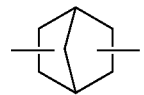

-continued

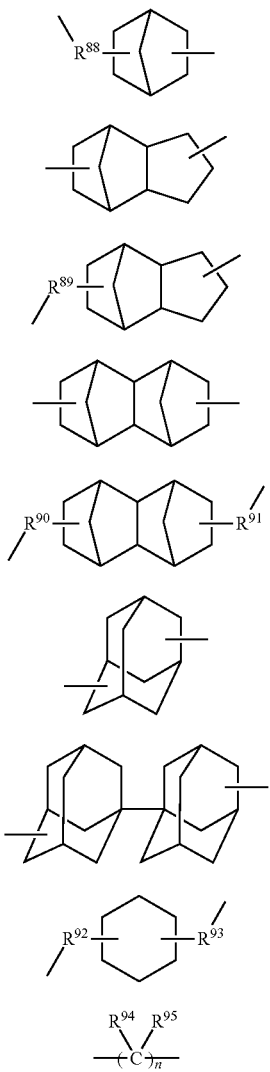

(19)
(20)
(21)
(22)
(23)
(24)
(25)
(26)
(27)

Here, $R^5$ to $R^{85}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; $R^{86}$ to $R^{93}$ are each independently an alkylene group of 1 to 10 carbons which may have a branched structure; $R^{94}$ and $R^{95}$ are each independently a hydrogen atom or an alkyl group of 1 to 10 carbons which may have a branched structure (with the proviso that $R^{94}$ and $R^{95}$ may together form a ring); and $W^1$ and $W^2$ are each independently a single bond, —$(CR^{96}R^{97})_m$— ($R^{96}$ and $R^{97}$ being each independently a hydrogen atom or an alkyl group of 1 to 10 carbons which may have a branched structure (with the proviso that these may together form a ring), and m being an integer from 1 to 10), O, S, SO, $SO_2$, $NR^{98}$, C=O, C(=O)O, OC(=O), OC(=O) O, $CONR^{99}$, $NR^{100}CO$ or $NR^{101}CONR^{102}$ ($R^{98}$ to $R^{102}$ being each independently a hydrogen atom or an alkyl group of 1 to 10 carbons which may have a branched structure).

The halogen atom is exemplified by fluorine, chlorine, bromine and iodine atoms.

The alkyl groups and alkoxy groups are exemplified by the same groups as mentioned above.

$X^1$ and $X^2$ are each independently a single bond, an alkylene group of 1 to 10 carbons which may have a branched structure, or a group of formula (28).

[Chemical Formula 6]

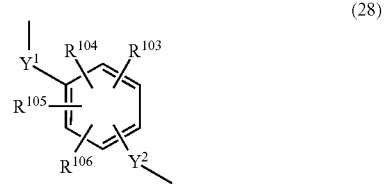

(28)

$R^{103}$ to $R^{106}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure. These halogen atoms, alkyl groups and alkoxy groups are exemplified in the same way as above.

Illustrative examples of alkylene groups of 1 to 10 carbons which may have a branched structure include methylene, ethylene, propylene, trimethylene, tetramethylene and pentamethylene groups.

The letter "n" is an integer from 1 to 20.

In particular, "Ar" is preferably at least one moiety from among those of formulas (3) and (6) to (12), and is more preferably at least one moiety from among those of formulas (3), (6), (8), (9) and (12). Examples of aryl groups of formulas (3) to (14) include, but are not limited to, those of the formulas shown below.

[Chemical Formula 7]

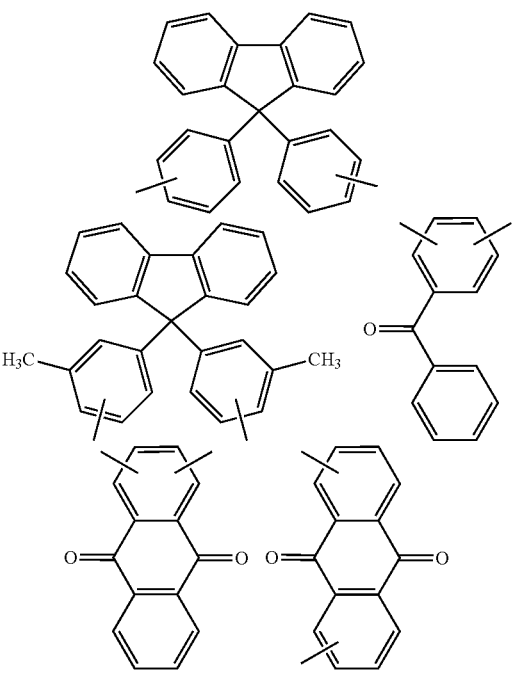

-continued
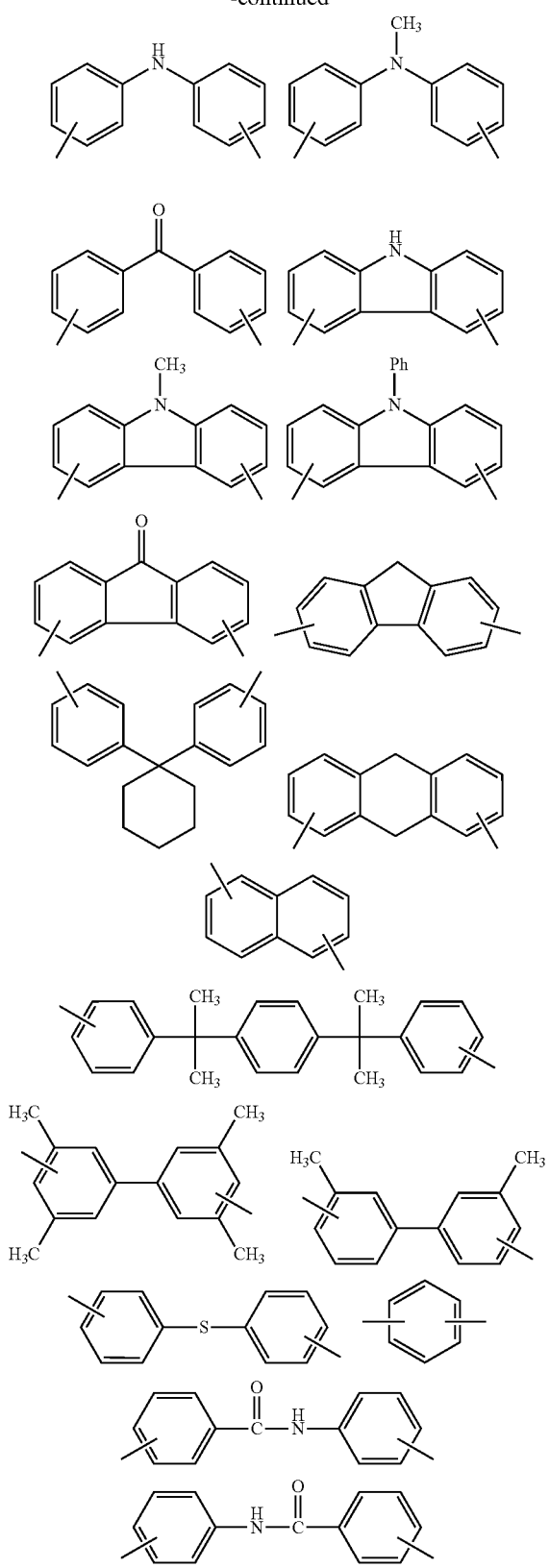
[Chemical Formula 8]
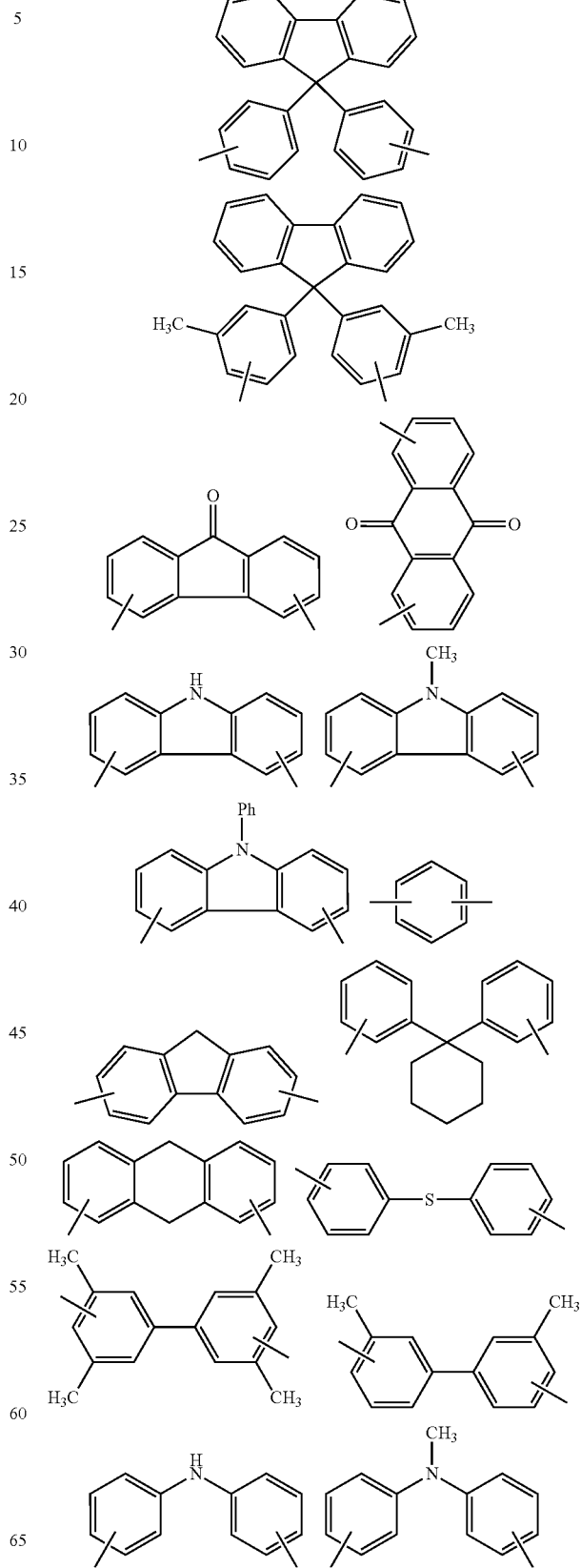
Of these, from the standpoint of obtaining a polymer having a higher refractive index, aryl groups of the following formulas are more preferred.

-continued

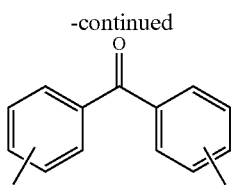

In particular, from the standpoint of further increasing the solubility in solvents having a high safety, such as resist solvents, it is preferable to include a recurring unit structure of formula (29).

[Chemical Formula 9]

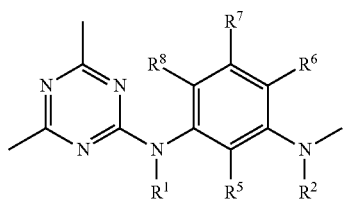
(29)

In this formula, $R^1$, $R^2$ and $R^5$ to $R^8$ are as defined above.

From such a standpoint, examples of especially preferred recurring unit structure are ones of formula (30) below, with a hyperbranched polymer of formula (31) below being best.

[Chemical Formula 10]

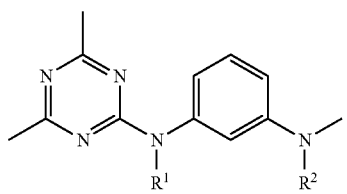
(30)

In this formula, $R^1$ and $R^2$ are as defined above.

[Chemical Formula 11]

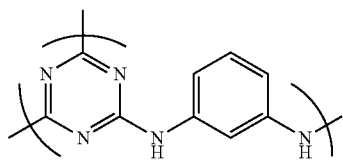
(31)

The weight-average molecular weight of the above triazine ring-containing hyperbranched polymer, although not particularly limited, is preferably from 500 to 500,000, and more preferably from 500 to 100,000. From the standpoint of further improving the heat resistance and lowering the shrinkage ratio, the weight-average molecular weight is preferably at least 2,000. From the standpoint of further increasing the solubility and lowering the viscosity of the solution obtained, the weight-average molecular weight is preferably not more than 50,000, more preferably not more than 30,000, and even more preferably not more than 10,000.

The weight-average molecular weight in this invention is the average molecular weight measured by gel permeation chromatography (GPC) against a polystyrene standard.

The triazine ring-containing hyperbranched polymer of this invention can be prepared by the method disclosed in above-cited Patent Document 1.

For example, as shown in Scheme 1 below, a hyperbranched polymer having the recurring structure (31') can be obtained by reacting a cyanuric halide (32) with an m-phenylenediamine compound (33) in a suitable organic solvent.

Scheme 1

[Chemical Formula 12]

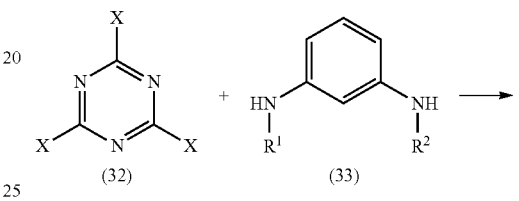

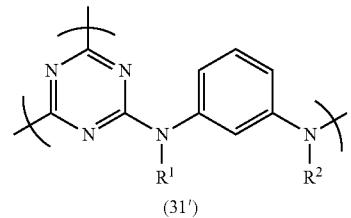
(31')

In the above formula, each occurrence of X is independently a halogen atom. $R^1$ and $R^2$ are as defined above.

As shown in Scheme 2 below, a hyperbranched polymer having the recurring structure (31') can be synthesized from a compound (34) obtained by reacting equimolar amounts of a cyanuric halide (32) and an m-phenylenediamine compound (33) in a suitable organic solvent.

Scheme 2

[Chemical Formula 13]

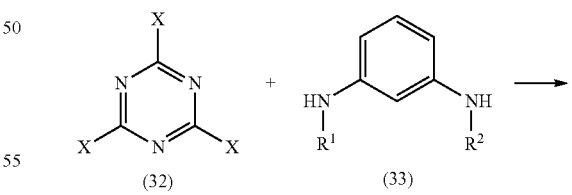

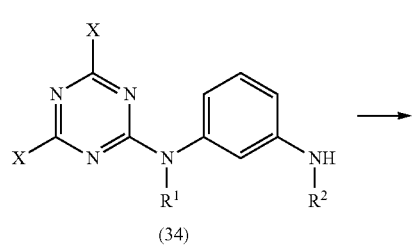
(34)

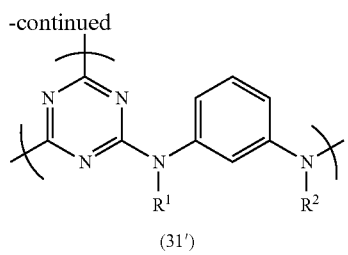

(31')

In the above formula, each occurrence of X is independently a halogen atom. $R^1$ and $R^2$ are as defined above.

In the methods of Schemes 1 and 2, the starting materials may be charged in any respective amounts so long as the target polymer is obtained, although the use of from 0.01 to 10 equivalents of the diamino compound (33) per equivalent of the triazine compound (32) is preferred.

In the method of Scheme 1 in particular, it is preferable to avoid using 3 equivalents of the diamino compound (33) per 2 equivalents of the cyanuric halide (32). By including the respective functional groups in amounts that are not chemically equivalent, the formation of a gel can be prevented.

To obtain hyperbranched polymers of various molecular weights which have numerous terminal triazine rings, it is preferable to use the diamino compound (33) in an amount of less than 3 equivalents per 2 equivalents of the cyanuric halide (32).

On the other hand, to obtain hyperbranched polymers of various molecular weights which have numerous terminal amines, it is preferable to use the cyanuric halide (32) in an amount of less than 2 equivalents per 3 equivalents of the diamino compound (33).

By suitably regulating the amounts of the diamino compound (33) and the cyanuric halide (32) in this way, the molecular weight of the resulting hyperbranched polymer can be easily regulated.

Various solvents that are commonly used in this type of reaction may be used as the organic solvent. Illustrative examples include tetrahydrofuran, dioxane, dimethylsulfoxide; amide solvents such as N,N-dimethylformamide, N-methyl-2-pryrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; and mixed solvents thereof.

Of the above, N,N-dimethylformamide, dimethylsulfoxide, N-methyl-2-pyrrolidone, N,N-dimethylacetamide, and mixed solvents thereof are preferred. N,N-Dimethylacetamide and N-methyl-2-pyrrolidone are especially preferred.

In the Scheme 1 reaction and the second stage reaction in Scheme 2, the reaction temperature may be suitably set in the range from the melting point to the boiling point of the solvent used, although the temperature is preferably from about 0° C. to about 150° C., and more preferably from 60° C. to 100° C.

In the Scheme 1 reaction in particular, to suppress linearity and increase the degree of branching, the reaction temperature is preferably from 60° C. to 150° C., more preferably from 80° C. to 150° C., and even more preferably from 80° C. to 120° C.

In the first stage reaction of Scheme 2, the reaction temperature may be suitably set in the range from the melting point to the boiling point of the solvent used, with a temperature of from about −50° C. to about 50° C. being preferred, a temperature of from about −20° C. to about 50° C. being more preferred, a temperature of from about −10° C. to about 50° C. being even more preferred, and a temperature of from −10° C. to 10° C. being still more preferred.

In the Scheme 2 method in particular, the use of a two-stage process consisting of a first step involving reaction at from −50° C. to 50° C. followed by a second step involving reaction at from 60° C. to 150° C. is preferred.

In each of the above reactions, the ingredients may be added in any order. However, in the Scheme 1 reaction, the best method is to heat a solution containing either the cyanuric halide (32) or the diamino compound (33) and the organic solvent to a temperature of from 60° C. to 150° C., and preferably from 80° C. to 150° C., then add the remaining ingredient—the diamino compound (33) or the cyanuric halide (32)—to the resulting solution at this temperature.

In this case, either ingredient may be used as the ingredient which is initially dissolved in the solvent or as the ingredient which is subsequently added, although a method wherein the cyanuric halide (33) is added to a heated solution of the diamino compound (32) is preferred.

In the Scheme 2 reactions, either ingredient may be used as the ingredient which is initially dissolved in the solvent or as the ingredient which is subsequently added, although a method wherein the diamino compound (33) is added to a cooled solution of the cyanuric halide (32) is preferred.

The subsequently added ingredient may be added neat or may be added as a solution of the ingredient dissolved in an organic solvent such as any of those mentioned above. However, taking into account the ease of operation and the controllability of the reaction, the latter approach is preferred.

Also, addition may be carried out gradually such as in a dropwise manner, or the entire amount may be added all at once in a batchwise manner.

In Scheme 1, even when the reaction is carried out in a single stage after both compounds have been mixed together in a heated state (that is, without raising the temperature in a stepwise fashion), the desired triazine ring-containing hyperbranched polymer can be obtained without gelation.

In the Scheme 1 reaction and the second stage reaction in Scheme 2, various bases which are commonly used during or after polymerization may be added.

Illustrative examples of such bases include potassium carbonate, potassium hydroxide, sodium carbonate, sodium hydroxide, sodium bicarbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of base added per equivalent of the cyanuric halide (32) is preferably from 1 to 100 equivalents, and more preferably from 1 to 10 equivalents. These bases may be used in the form of an aqueous solution.

In the methods of both schemes, following reaction completion, the product can be easily purified by a suitable technique such as reprecipitation.

Also, in the present invention, some portion of the halogen atoms on at least one terminal triazine ring may be capped with, for example, an alkyl, aralkyl, aryl, alkylamino, alkoxysilyl-containing alkylamino, aralkylamino, arylamino, alkoxy, aralkyloxy, aryloxy or ester group.

Of these, alkylamino, alkoxysilyl-containing alkylamino, aralkylamino and arylamino groups are preferred. Alkylamino and arylamino groups are more preferred. Arylamino groups are even more preferred.

These alkyl groups and alkoxy groups are exemplified by the same groups as mentioned above.

Illustrative examples of ester groups include methoxycarbonyl and ethoxycarbonyl groups.

Illustrative examples of aryl groups include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

Illustrative examples of aralkyl groups include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

Illustrative examples of alkylamino groups include methylamino, ethylamino, n-propylamino, isopropylamino, n-butylamino, isobutylamino, s-butylamino, t-butylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino and 1-ethyl-2-methyl-n-propylamino groups.

Illustrative examples of aralkylamino groups include benzylamino, methoxycarbonylphenylmethylamino, ethoxycarbonylphenylmethylamino, p-methylphenylmethylamino, m-methylphenylmethylamino, o-ethylphenylmethylamino, m-ethylphenylmethylamino, p-ethylphenylmethylamino, 2-propylphenylmethylamino, 4-isopropylphenylmethylamino, 4-isobutylphenylmethylamino, naphthylmethylamino, methoxycarbonylnaphthylmethylamino and ethoxycarbonylnaphthylmethylamino groups.

Illustrative examples of arylamino groups include phenylamino, methoxycarbonylphenylamino, ethoxycarbonylphenylamino, naphthylamino, methoxycarbonylnaphthylamino, ethoxycarbonylnaphthylamino, anthranylamino, pyrenylamino, biphenylamino, terphenylamino and fluorenylamino groups.

Alkoxysilyl-containing alkylamino groups are exemplified by monoalkoxysilyl-containing alkylamino groups, dialkoxysilyl-containing alkylamino groups and trialkoxysilyl-containing alkylamino groups. Illustrative examples include 3-trimethoxysilylpropylamino, 3-triethoxysilylpropylamino, 3-dimethylethoxysilylpropylamino, 3-methyldiethoxysilylpropylamino, N-(2-aminoethyl)-3-dimethylmethoxysilylpropylamino, N-(2-aminoethyl)-3-methyldimethoxysilylpropylamino and N-(2-aminoethyl)-3-trimethoxysilylpropylamino groups.

Illustrative examples of aryloxy groups include phenoxy, naphthoxy, anthranyloxy, pyrenyloxy, biphenyloxy, terphenyloxy and fluorenyloxy groups.

Illustrative examples of aralkyloxy groups include benzyloxy, p-methylphenylmethyloxy, m-methylphenylmethyloxy, o-ethylphenylmethyloxy, m-ethylphenylmethyloxy, p-ethylphenylmethyloxy, 2-propylphenylmethyloxy, 4-isopropylphenylmethyloxy, 4-isobutylphenylmethyloxy and α-naphthylmethyloxy groups.

These groups can be easily introduced by substituting a halogen atom on a triazine ring with a compound that furnishes the corresponding substituent. For example, as shown in Scheme 3 below, by adding aniline and carrying out a reaction, a hyperbranched polymer (35) having a phenylamino group on at least one end is obtained.

Scheme 3

[Chemical Formula 14]

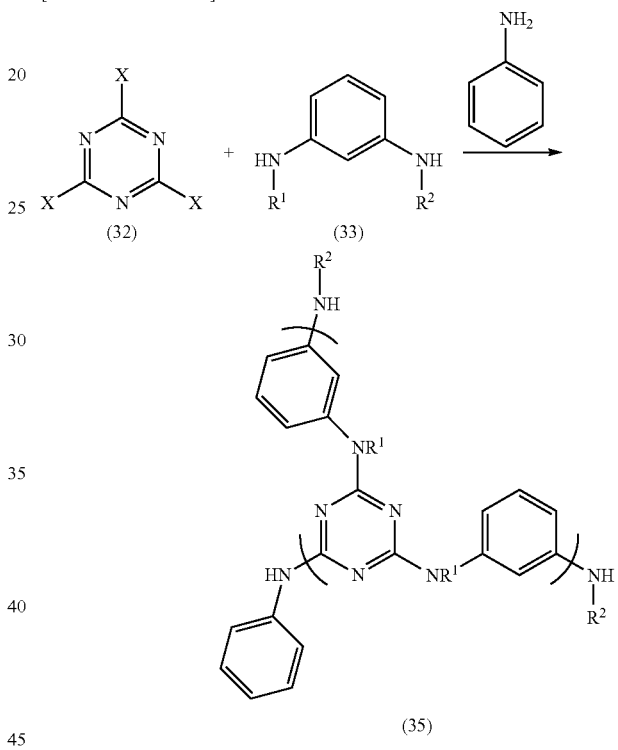

In these formulas, X, $R^1$ and $R^2$ are as defined above.

At this time, by reacting the cyanuric halide with a diaminoaryl compound while at the same time charging an organic monoamine, that is, in the presence of an organic monoamine, it is possible to obtain a flexible hyperbranched polymer having a low degree of branching in which the rigidity of the hyperbranched polymer has been diminished.

Because the hyperbranched polymer obtained in this way has an excellent solubility in solvent (meaning that agglomeration is inhibited) and has an excellent crosslinkability with a crosslinking agent, it is especially advantageous when used as a composition in combination with the subsequently described crosslinking agent.

An alkyl monoamine, aralkyl monoamine or aryl monoamine may be used here as the organic monoamine.

Illustrative examples of alkyl monoamines include methylamine, ethylamine, n-propylamine, isopropylamine, n-butylamine, isobutylamine, s-butylamine, t-butylamine, n-pentylamine, 1-methyl-n-butylamine, 2-methyl-n-butylamine, 3-methyl-n-butylamine, 1,1-dimethyl-n-propylamine, 1,2-dimethyl-n-propylamine, 2,2-dimethyl-n-propylamine, 1-ethyl-n-propylamine, n-hexylamine, 1-methyl-n-pentylamine, 2-methyl-n-pentylamine, 3-methyl-n-pentylamine, 4-methyl-n-pentylamine, 1,1-dimethyl-n-butylamine, 1,2-dimethyl-n-butylamine, 1,3-dimethyl-n-butylamine, 2,2-dimethyl-n-butylamine, 2,3-dimethyl-n-butylamine, 3,3-dimethyl-n-butylamine, 1-ethyl-n-butylamine, 2-ethyl-n-butylamine, 1,1,2-trimethyl-n-propylamine, 1,2,2-trimethyl-n-propylamine, 1-ethyl-1-methyl-n-propylamine, 1-ethyl-2-methyl-n-propylamine and 2-ethylhexylamine.

Illustrative examples of aralkyl monoamines include benzylamine, p-methoxycarbonylbenzylamine, p-ethoxycarbonylphenylbenzyl, p-methylbenzylamine, m-methylbenzylamine and o-methoxybenzylamine.

Illustrative examples of aryl monoamines include aniline, p-methoxycarbonylaniline, p-ethoxycarbonylaniline, p-methoxyaniline, 1-naphthylamine, 2-naphthylamine, anthranylamine, 1-aminopyrene, 4-biphenylylamine, o-phenylaniline, 4-amino-p-terphenyl and 2-aminofluorene.

In this case, the amount of organic monoamine used per equivalent of the cyanuric halide is set to preferably from 0.05 to 500 equivalents, more preferably from 0.05 to 120 equivalents, and even more preferably from 0.05 to 50 equivalents.

To hold down linearity and increase the degree of branching, the reaction temperature in this case is preferably from 60 to 150° C., more preferably from 80 to 150° C., and even more preferably from 80 to 120° C.

However, mixing of the three ingredients—an organic monoamine, a cyanuric halide and a diaminoaryl compound—may be carried out at a low temperature, in which case the temperature is set to preferably from about −50° C. to about 50° C., more preferably from about −20° C. to about 50° C., and even more preferably from −20° C. to 10° C. After low-temperature charging, it is preferable to raise the temperature without interruption (i.e., in a single step) to the polymerization temperature and carry out the reaction.

Alternatively, the mixing of two ingredients—a cyanuric halide and a diaminoaryl compound—may be carried out at a low temperature, in which case the temperature is set to preferably from about −50° C. to about 50° C., more preferably from about −20° C. to about 50° C., and even more preferably from −20° C. to 10° C. After low-temperature charging, it is preferable to add the organic monoamine, raise the temperature without interruption (i.e., in a single step) to the polymerization temperature and carry out the reaction.

The reaction of the cyanuric halide with the diaminoaryl compound in the presence of such an organic monoamine may be carried out using an organic solvent like those mentioned above.

Also, "A" above is preferably at least one moiety selected from among those of formulas (3), (6), (7), (8), (12), (14) and (27). Examples include, but are not limited to, moieties of the formulas shown below.

[Chemical Formula 15]

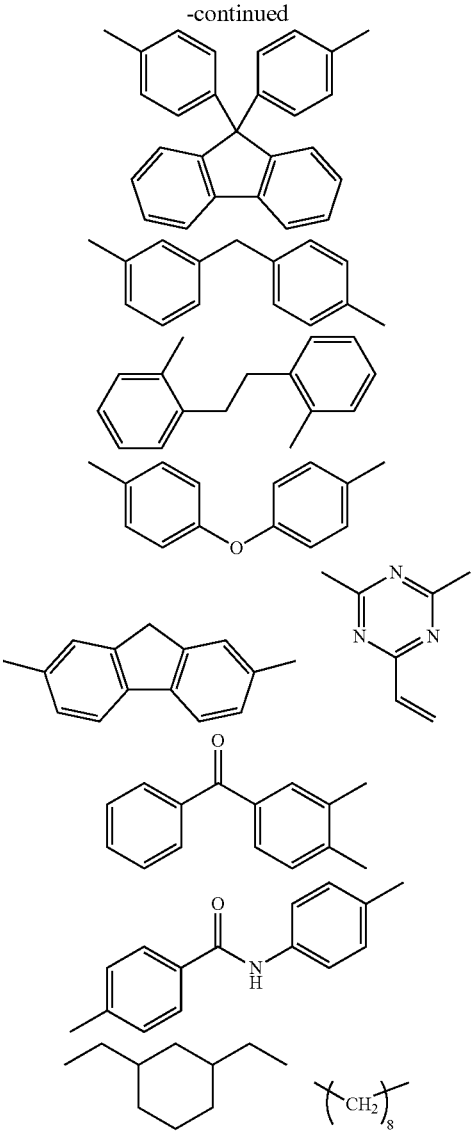

The weight-average molecular weight of the aromatic polyamide-based hyperbranched polymer is from 1,000 to 100,000. From the standpoint of further improving the heat resistance, the weight-average molecular weight is preferably at least 2,000. From the standpoint of further increasing the solubility and lowering the viscosity of the solution obtained, the weight-average molecular weight is preferably not more than 50,000, and more preferably not more than 20,000.

As noted above, the aromatic polyamide-based hyperbranched polymer used in this invention is obtained by reacting a benzenetricarboxylic acid or a derivative thereof with a diamine compound in the presence of at least a monofunctional substance having one functional group capable of reacting with the benzenetricarboxylic acid or a derivative thereof. Specifically, as shown in Scheme 4 below, an aromatic polyamide-based hyperbranched polymer having the recurring structure (38) can be obtained by reacting a 1,3,5-benzenetricarbonyl trihalide (36) with m-phenylenediamine (37) in the presence of the monofunctional substance aniline.

Scheme 4

[Chemical Formula 16]

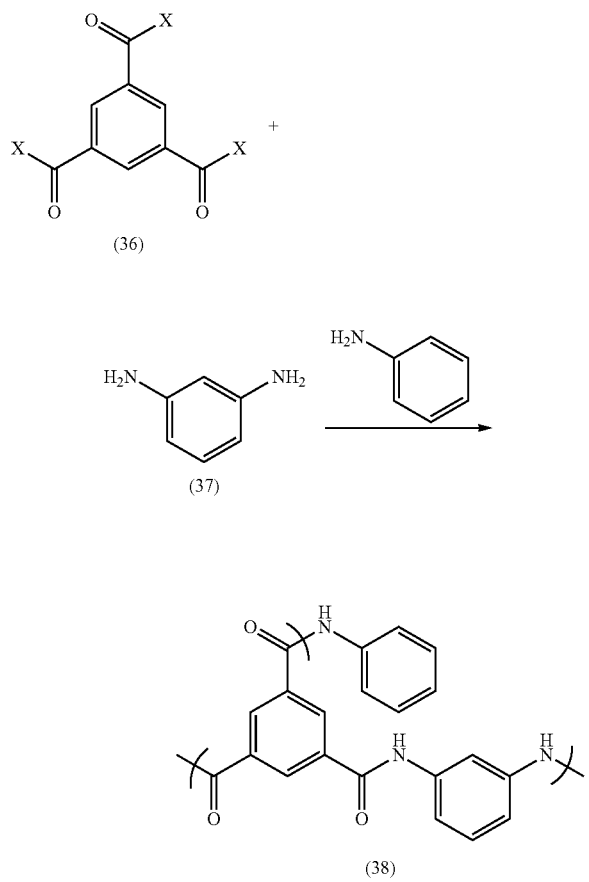

Scheme 5

[Chemical Formula 17]

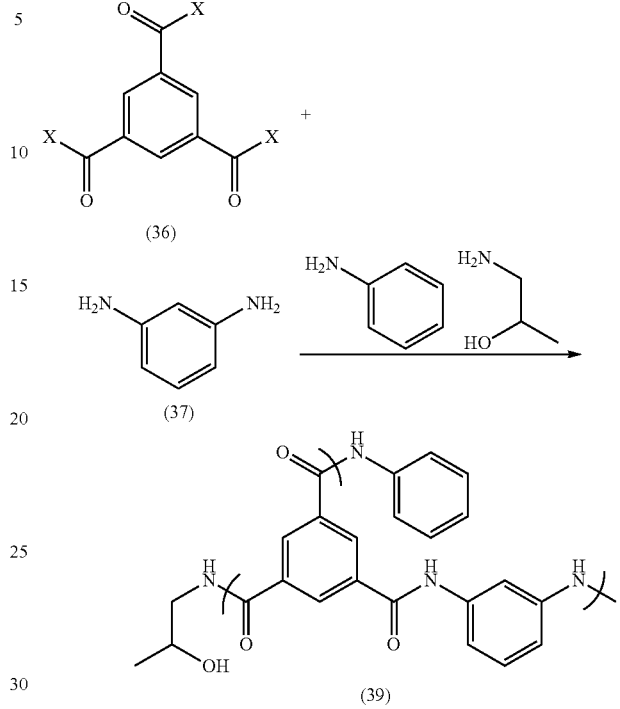

In the formula, each occurrence of X is independently a halogen atom.

In the aromatic polyamide-based hyperbranched polymer used in this invention, to further increase the hardness of the resulting thin-film, the benzenetricarboxylic acid end or diamine end may be capped with an end-capping compound having a crosslinkable group.

An aromatic polyamide in which the benzenetricarboxylic acid end has been end-capped can be obtained by reacting a benzenetricarboxylic acid or a derivative thereof with a diamine compound in the presence of both a monofunctional substance having one functional group capable of reacting with the benzenetricarboxylic acid or a derivative thereof and an end-capping compound having a functional group capable of reacting with the benzenetricarboxylic acid or a derivative thereof and having also a crosslinkable group.

Specifically, as shown in Scheme 5 below, for example, an aromatic polyamide-based hyperbranched polymer having recurring structure (39) can be obtained by reacting a 1,3,5-benzenetricarbonyl trihalide (36) and m-phenylenediamine (37) within a suitable organic solvent and in the presence of the monofunctional substance aniline and the end-capping compound 1-amino-2-propanol.

In the formula, each occurrence of X is independently a halogen atom.

An aromatic polyamide in which the diamine end has been end-capped can be obtained by reacting a benzenetricarboxylic acid or a derivative thereof with a diamine compound in the presence of a monofunctional substance having one functional group capable of reacting with the benzenetricarboxylic acid or a derivative thereof, and by additional reaction in the presence of an end-capping compound having a functional group capable of reacting with an end that originates from the diamine and having also a crosslinkable group.

Specifically, as shown in Scheme 6 below, for example, an aromatic polyamide-based hyperbranched polymer having recurring structure (40) can be obtained by reacting a 1,3,5-benzenetricarbonyl trihalide (36) and m-phenylenediamine (37) within a suitable organic solvent and in the presence of the monofunctional substance aniline, and then adding the end-capping compound acryloyl chloride and reacting in a suitable organic solvent.

Scheme 6

[Chemical Formula 18]

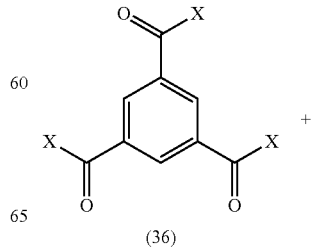

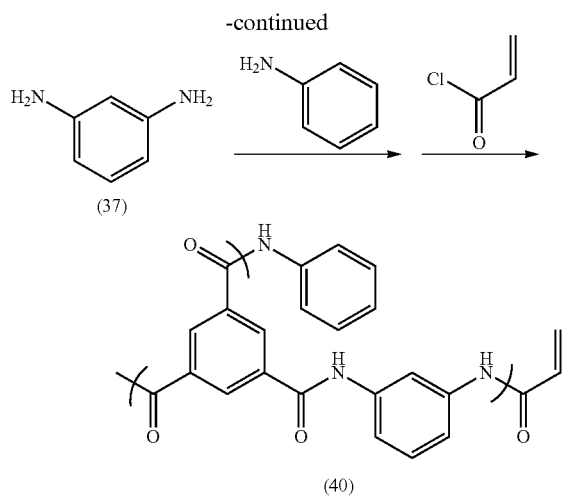

(37)

(40)

In the formula, each occurrence of X is independently a halogen atom.

In the preparation method of the invention, the respective starting materials may be charged in any suitable amounts so long as the target polymer is obtained, although it is preferable to use from 0.01 to 10 equivalents, and more preferable to use from 0.1 to 5 equivalents, of a diamine compound such as m-phenylenediamine (37) per equivalent of the benzenetricarboxylic acid or a derivative thereof such as 1,3,5-benzenetricarbonyl trihalide (36).

The amount in which the monofunctional substance such as aniline is charged is not particularly limited. However, from the standpoint of increasing the solubility of the resulting aromatic polyamide-based hyperbranched polymer, the amount is preferably from 0.01 to 10 equivalents, and more preferably from 0.1 to 5 equivalents, per equivalent of the benzenetricarboxylic acid or a derivative thereof.

Also, in the reaction in Scheme 5, the amount in which the end-capping compound such as 1-amino-2-propanol is charged is not particularly limited. However, from the standpoint of increasing the reactivity of the resulting aromatic polyamide-based hyperbranched polymer with a crosslinking agent, the amount is preferably from 0.01 to 20 equivalents, and more preferably from 0.1 to 5 equivalents, per equivalent of the benzenetricarboxylic acid or a derivative thereof.

At the same time, in the reaction in Scheme 6, the amount in which the end-capping compound such as acryloyl chloride is charged is not particularly limited. However, from the standpoint of increasing the reactivity of the resulting aromatic polyamide-based hyperbranched polymer with a crosslinking agent, the amount is preferably from 0.01 to 20 equivalents, and more preferably from 0.1 to 5 equivalents, per equivalent of the diamine compound.

In the reaction in Scheme 5, the order in which the various ingredients are added is not particularly limited. All the ingredients may be mixed together at one time, the ingredients may be charged one at a time in a particular order, or some of the ingredients may be mixed together and the resulting mixture may be mixed with the other ingredients. However, to efficiently suppress gelation during the reaction, it is preferable to use a method wherein first a mixture of the diamine compound and the monofunctional substance is mixed with the benzenetricarboxylic acid (or a derivative thereof), after which the end-capping compound is added.

In the reaction in Scheme 4 and the first stage of Scheme 6, the order in which the respective ingredients are added is not particularly limited. All the ingredients may be mixed together at one time, the ingredients may be charged one at a time in a particular order, or some of the ingredients may be mixed together and the resulting mixture may be mixed with the other ingredients. However, to efficiently suppress gelation during the reaction, it is preferable to use a method in which a mixture of the diamine compound and the monofunctional substance is mixed with the benzenetricarboxylic acid (or a derivative thereof).

In the method of preparing the aromatic polyamide-based hyperbranched polymer of the invention, because the reaction is carried out in the presence of a monofunctional substance and an end-capping compound which are capable of reacting with a benzenetricarboxylic acid or a derivative thereof, intermediates having only two reactive sites that have been formed by the reaction of these compounds with a benzenetricarboxylic acid, etc. also appear to take part in the polymerization reaction.

Therefore, even in the aromatic polyamides obtained in the above Scheme 4 to 6 reactions, in addition to the hyperbranched recurring structures (38) to (40) above, the linear recurring structure (38') below resulting from polymerization of an intermediate obtained by the reaction of aniline or the like is also thought to exist.

[Chemical Formula 19]

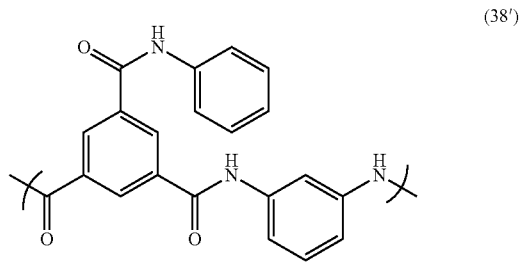

(38')

The organic solvent is exemplified by the same solvents as mentioned above in connection with the method of preparing the triazine ring-containing hyperbranched polymer. Here, N,N-dimethylformamide, dimethylsulfoxide, N-methyl-2-pyrrolidone, N,N-dimethylacetamide, and mixed solvents thereof are preferred, with N,N-dimethylacetamide and N-methyl-2-pyrrolidone being especially preferred.

In the above polymerization reaction, the reaction temperature may be suitably set in the range from the melting point to the boiling point of the solvent used, although the temperature is preferably from about −50° C. to about 150° C., more preferably from −30° C. to 100° C., and even more preferably from −30° C. to 50° C.

Various commonly used bases may be used in this reaction. Illustrative examples include the same bases as mentioned above in connection with the method of preparing the triazine ring-containing hyperbranched polymer.

The amount of base added is preferably from 1 to 100 equivalents, and more preferably from 1 to 10 equivalents, per equivalent of the benzenetricarboxylic acid or a derivative thereof. These bases may be used in the form of an aqueous solution.

Following completion of the reaction, the product can be easily purified by reprecipitation or the like.

The benzenetricarboxylic acid (or derivative) used in the Scheme 4 to 6 reactions is a 1,3,5-substitution product, but is not limited to this. For example, it is also possible to use a 1,2,4-substitution product.

The halogen atoms in the benzenetricarbonyl trihalide are preferably chlorine atoms or bromine atoms.

The monofunctional substance in Schemes 4 to 6 is not particularly limited, provided it is a substance which is capable of reacting with a carboxyl group or derivative group thereof on the benzenetricarboxylic acid or benzenetricarboxylic acid derivative that is used.

Such substances are exemplified by substances having on the molecule an amino group, a hydroxyl group, a thiol (mercapto) group, an isocyanate group or an isothiocyanate group. In this invention, a monofunctional substance having an amino group or a hydroxyl group is preferred.

Examples of monofunctional substances having an amino group include aliphatic monoamines such as methylamine, ethylamine, n-propylamine, i-propylamine and n-butylamine; aromatic monoamines such as aniline, o-, m- or p-toluidine, o-, m- or p-anisidine, and 1- or 2-naphthylamine; araliphatic monoamines such as benzylamine; and alicyclic monoamines such as cyclohexylamine.

Illustrative examples of monofunctional substances having a hydroxyl group include aliphatic monoalcohols such as methanol, ethanol, n-propanol, i-propanol, n-butanol and i-butanol; aromatic monoalcohols such as phenol, o-, m or p-cresol, and 1- or 2-naphthol; and araliphatic monoalcohols such as benzyl alcohol.

Illustrative examples of monofunctional substances having a thiol group include aliphatic monothiols such as methanethiol, ethanethiol, 1-propanethiol, 2-propanethiol, 1-butanethiol and 2-butanethiol; aromatic monothiols such as thiophenol; and araliphatic monothiols such as benzenemethanethiol.

Illustrative examples of monofunctional substances having an isocyanate group include aliphatic monoisocyanates such as butyl isocyanate and hexyl isocyanate; aromatic monoisocyanates such as phenyl isocyanate; araliphatic monoisocyanates such as benzyl isocyanate; and alicyclic monoisocyanates such as cyclohexyl isocyanate.

Illustrative examples of monofunctional substances having an isothiocyanate group include aliphatic monoisothiocyanates such as butyl isothiocyanate and dodecyl isothiocyanate; aromatic monoisothiocyanates such as phenyl isothiocyanate; araliphatic monoisothiocyanates such as benzyl isothiocyanate; and alicyclic monoisothiocyanates such as cyclohexyl isothiocyanate.

In addition, the end-capping compound having a functional group capable of reacting with benzenetricarboxylic acid or a derivative thereof and having also a crosslinkable group is not particularly limited, provided it is a compound which has at least one functional group capable of reacting with a carboxyl group or a derivative group thereof on the benzenetricarboxylic acid or benzenetricarboxylic acid derivative that is used and which also has a crosslinkable group.

The functional group capable of reacting with benzenetricarboxylic acid or a derivative thereof is exemplified by, as mentioned above, an amino group, a hydroxyl group, a thiol (mercapto) group, an isocyanate group and an isothiocyanate group. Here too, an amino group or a hydroxyl group is preferred.

The crosslinkable group is selected according to the type of crosslinking agent to be used, and is generally exemplified by an amino group, a hydroxyl group, a thiol (mercapto) group, an isocyanate group, an isothiocyanate group, and a carbon-carbon unsaturated bond-containing group such as a vinyl group or a (meth)acryloxy group.

The end-capping compound used in the Scheme 5 reaction is preferably a compound having an amino group and a hydroxyl group, such as 1-amino-2-propanol; a compound having an amino group and a phenolic hydroxyl group, such as 2-aminophenol, 3-aminophenol and 4-aminophenol; a compound having an amino group and a carbon-carbon double bond, such as aminostyrene; or a compound having a hydroxyl group and a (meth)acryloxy group, such as 2-hydroxyethyl (meth)acrylate, 2-hydroxypropyl (meth)acrylate, 2-hydroxybutyl (meth)acrylate, 2-hydroxyethyl acrylate, 2-hydroxypropyl acrylate, 2-hydroxy-3-phenyloxypropyl (meth)acrylate, 4-hydroxybutyl acrylate, neopentyl glycol mono(meth)acrylate, 4-hydroxycyclohexyl (meth)acrylate, 1,6-hexanediol mono(meth)acrylate, pentaerythritol penta(meth)acrylate and dipentaerythritol penta (meth)acrylate.

The end-capping compound may be used singly or two or more may be used in combination.

The end-capping compound having a functional group capable of reacting with an end group from a diamine compound and having also a crosslinkable group is not particularly limited, provided it is a compound having at least one functional group capable of reacting with an amino group from a diamine compound and having also a crosslinkable group.

The functional group capable of reacting with an amino group is exemplified by carboxyl groups and derivative groups of carboxyl groups, such as acid anhydride groups and acid halide groups; and also by isocyanate groups and isothiocyanate groups. Of these, carboxyl groups and derivative groups thereof are preferred, with carbonyl halide groups being most preferred.

The crosslinkable group is selected according to the type of crosslinking agent to be used, and is generally exemplified by amino groups, hydroxyl groups, thiol (mercapto) groups, isocyanate groups, isothiocyanate groups, and carbon-carbon unsaturated bond-containing groups such as vinyl groups and (meth)acryloxy groups.

The end-capping compound used in the Scheme 6 reaction is exemplified by acryloyl chloride, methacryloyl chloride, crotonoyl chloride, tigloyl chloride, acrylic acid, methacrylic acid, crotonic acid, 3-methylcrotonic acid, and the products available under the trade names Karenz AOI, MOI and BEI (all from Showa Denko KK). Here too, the end-capping compound may be used singly or two or more may be used in combination.

When preparing the aromatic polyamide of the invention, to increase the linear components within the resulting polyamide and thereby confer flexibility, an aromatic dicarboxylic acid or a derivative thereof, such as benzenedicarbonyl dihalide, may additionally be included.

Illustrative examples of aromatic dicarboxylic acids and derivatives thereof include 1,4-benzenedicarbonyl dihalide (terephthaloyl halide), 1,3-benzenedicarbonyl dihalide (isophthaloyl halide) and 1,2-benzenedicarbonyl dihalide (phthaloyl halide). The halide here is preferably a chloride or a bromide.

The aromatic dicarboxylic acids and derivatives thereof are included in an amount which, although not particularly limited so long as a hyperbranched structure can be formed, is preferably from 0.01 to 0.5 equivalent, and more preferably from 0.1 to 0.4 equivalent, per equivalent of the total amount of benzenetricarboxylic acid and derivatives thereof.

In the film-forming composition of the invention, the relative proportions of the triazine ring-containing hyperbranched polymer and the aromatic polyamide-based hyperbranched polymer are not particularly limited. However, from the standpoint of the compatibility between the polymers and the refractive index, transparency and heat resistance of the resulting thin-film, the proportions, expressed as the weight ratio (triazine ring-containing hyperbranched polymer) (aromatic polyamide-based hyperbranched polymer), may be set to preferably from about 1:9 to about 9:1, and more preferably from 2:8 to 8:2, with the use of the aromatic polyamide-based hyperbranched polymer in excess being even more preferred, and a ratio of from 2:8 to 4:6 being best.

A crosslinking agent may be included in the film-forming composition of the invention for the purpose of further increasing the hardness of the resulting cured film. As noted above, in this invention, by the using the above two types of hyperbranched polymer in combination, a decline in the refractive index of the resulting cured film is suppressed even in cases where a crosslinking agent has been added.

The crosslinking agent is not particularly limited, provided it is a compound having a substituent that is capable of reacting with at least crosslinkable functional groups on the aromatic polyamide-based hyperbranched polymer used in the invention.

Examples of such compounds include melamine-based compounds having a crosslink-forming substituent such as a methylol group or a methoxymethyl group, substituted urea compounds, compounds having a crosslink-forming substituent such as an epoxy group or an oxetanyl group, compounds having a blocked isocyanate group, compounds having an acid anhydride group, compounds having a (meth)acryl group, and phenoplast compounds. From the standpoint of heat resistance and storage stability, compounds having an epoxy group, a blocked isocyanate group or a (meth)acryl group are preferred. Compounds containing a blocked isocyanate group, and polyfunctional epoxy compounds and/or polyfunctional (meth)acrylate compounds which give photocurable compositions without the use of an initiator are especially preferred, and polyfunctional (meth)acrylate compounds are more preferred.

These compounds, when used for end group treatment of the polymer, should have at least one crosslink-forming substituent. When used for crosslinking treatment between polymers, they must have at least two crosslink-forming substituents.

The polyfunctional epoxy compounds are not particularly limited, provided they have two or more epoxy groups on the molecule.

Illustrative examples include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexane carboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH-434L (from Tohto Kasei Co., Ltd.); epoxy resins having a cyclohexene oxide structure, such as Epolead GT-401, GT-403, GT-301 and GT-302, and also Celloxide 2021 and 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, 103S, 104S, 1020, 1025 and 1027 (Nippon Kayaku Co., Ltd.), and Epikote (now "jER") 180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

The polyfunctional (meth)acrylate compounds are not particularly limited, provided they have two or more (meth)acryl groups on the molecule.

Illustrative examples include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate and 1,6-hexanediol dimethacrylate.

The polyfunctional (meth)acrylate compound may be acquired as a commercial product, illustrative examples of which include NK Ester A-200, A-400, A-600, A-1000, A-9300 (tris(2-(acryloyloxy)ethyl) isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, ATM-4E and ATM-35E (all from Shin-Nakamura Chemical Co., Ltd.); KAYARAD™ DPEA-12, PEG400DA, THE-330 and RP-1040 (all from Nippon Kayaku Co., Ltd.); M-210 and M-350 (from Toagosei Co., Ltd.); KAYARAD™ DPHA, NPGDA and PET30 (Nippon Kayaku Co., Ltd.); NK Ester A-DPH, A-TMPT, A-DCP, A-HD-N, TMPT, DCP, NPG and HD-N (all from Shin-Nakamura Chemical Co., Ltd.); NK Oligo U-15HA (Shin-Nakamura Chemical Co., Ltd.); and NK Polymer Vanaresin GH-1203 (Shin-Nakamura Chemical Co., Ltd.).

The acid anhydride compounds are not particularly limited, provided they are carboxylic acid anhydrides obtained by the dehydration/condensation of two molecules of carboxylic acid. Illustrative examples include those having one acid anhydride group on the molecule, such as phthalic anhydride, tetrahydrophthalic anhydride, is hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and those having two acid anhydride groups on the molecule, such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

The compounds containing blocked isocyanate groups are not particularly limited, provided they are compounds having on the molecule at least two blocked isocyanate groups, i.e., isocyanate groups (—NCO) that have been blocked with suitable protecting groups, and wherein, upon exposure of the compound to an elevated temperature during heat curing, the protecting groups (blocking moieties) are removed by thermal dissociation and the isocyanate groups that form as a result induce crosslinking reactions with the resin. Such compounds are exemplified by compounds having on the molecule at least two groups of the following formula (which groups may be the same or may each differ).

[Chemical Formula 20]

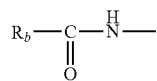

In the formula, $R_b$ is an organic group serving as a blocking moiety.

Such a compound can be obtained by, for example, reacting a suitable blocking agent with a compound having two or more isocyanate groups on the molecule.

Illustrative examples of compounds having two or more isocyanate groups on the molecule include polyisocyanates such as isophorone diisocyanate, 1,6-hexamethylene diisocyanate, methylenebis(4-cyclohexyl isocyanate) and trimethylhexamethylene diisocyanate, and also dimers and trimers thereof, as well as the reaction products of these with diols, triols, diamines or triamines.

Illustrative examples of the blocking agent include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- or p-cresol; lactams such as s-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

The compound containing blocked isocyanate groups may also be acquired as a commercial product, illustrative examples of which include B-830, B-815N, B-842N, B-870N, B-874N, B-882N, B-7005, B7030, B-7075 and B-5010 (all from Mitsui Chemicals Polyurethane, Inc.); Duranate® 17B-60PX, TPA-B80E, MF-B60X, MF-K60X, MF-K60B, E402-B80T and E402-B80B (all from Asahi Kasei Chemicals Corporation); and KarenzMOI-BM™ (Showa Denko KK).

The aminoplast compounds are not particularly limited, provided they are compounds which have at least two methoxymethylene groups on the molecule. Illustrative examples include the following melamine compounds: compounds of the Cymel® series, such as hexamethoxymethylmelamine (Cymel® 303), tetrabutoxymethylglycoluril (Cymel® 1170) and tetramethoxymethylbenzoguanamine (Cymel® 1123) (all from Nihon Cytec Industries, Inc.); and compounds of the Nikalac® series, including the methylated melamine resins Nikalac® MW-30HM, MW-390, MW-100LM and MX-750LM, and the methylated urea resins Nikalac® MX-270, MX-280 and MX-290 (all from Sanwa Chemical Co., Ltd.).

The oxetane compounds are not particularly limited, provided they are compounds which have at least two oxetanyl groups on the molecule. Examples include the oxetanyl group-bearing compounds OXT-221, OX-SQ-H and OX-SC (from Toagosei Co., Ltd.).

Phenoplast compounds are compounds which have at least two hydroxymethylene groups on the molecule. Upon exposure to an elevated temperature during heat curing, crosslinking reactions proceed by way of dehydration/condensation reactions with the polymer of the invention.

Illustrative examples of phenoplast compounds include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane and α,α-bis(4-hydroxy-2,5-dimethylphenyl)-4-formyltoluene.

The phenoplast compounds may also be acquired as commercial products, illustrative examples of which include 26DMPC, 46DMOC, DM-BIPC-F, DM-BIOC-F, TM-BIP-A, BISA-F, BI25X-DF and BI25X-TPA (all from Asahi Organic Chemicals Industry Co., Ltd.).

The oxazoline compounds are not particularly limited, provided they are compounds which have at least two oxazoline rings on the molecule. Examples include 2-oxazoline, 2-amino-2-oxazoline, 2,2'-bis(2-oxazoline), 1,3-bis(4,5-dihydro-2-oxazolyl)benzene, 1,4-bis(4,5-dihydro-2-oxazolyl)benzene, 1,3,5-tris(4,5-dihydro-2-oxazolyl)benzene, 2,2'-(2,6-pyridinediyl)bis(4-isopropyl-2-oxazoline), 2,2'-(2,6-pyridinediyl)bis(4-phenyl-2-oxazoline), 2-phenyl(2-oxazoline), 4,4-dimethyl-2-oxazoline, 2,2'-isopropylidenebis(4-phenyl-2-oxazoline), 2-ethyl-2-oxazoline, 2,2'-isopropylidenebis(4-t-butyl-2-oxazoline), 2-isopropyl-2-oxazoline, 4-methoxymethyl-2-methyl-5-phenyl-2-oxazoline, 2-methyl-2-oxazoline, 2,4,4-trimethyl-2-oxazoline, and the following Epocros series compounds available from Nippon Shokubai Co., Ltd.: K-1010E, K-2010E, K-1020E, K-2020E, K-1030E, K-2030E, WS-500, WS-700, RPS-1005 and RAS-1005.

The above crosslinking agents may be used singly or two or more may be used in combination. The amount of crosslinking agent used per 100 parts by weight of the aromatic polyamide-based hyperbranched polymer is preferably from 1 to 100 parts by weight. From the standpoint of solvent resistance, the lower limit is preferably 2 parts by weight, and more preferably 5 parts by weight. From the standpoint of control of the refractive index, the upper limit is preferably 30 parts by weight, and more preferably 20 parts by weight.

In cases where a crosslinking agent having an isocyanate group or a blocked isocyanate group is used, by using a binder resin having two or more active hydrogen-containing groups that are capable of reacting with isocyanate groups on the compound, the film hardness and resistance to moisture absorption can be enhanced. These active hydrogen-containing groups are preferably hydroxyl groups or the like that are capable of reacting in a high yield with isocyanate groups.

Therefore, in order to form a crosslinked structure with the blocked isocyanate serving as the curing agent, a polyol compound having two or more hydroxyl groups is preferred; when the polyol compound has only one functional group, a high molecular weight results without the formation of a crosslinked structure.

In cases where a polyol compound is used, although the amount of polyol compound used is not particularly limited, to further increase the crosslink density of the resulting cured film, from 1 to 200 parts by weight of polyol compound per 100 parts by weight of the aromatic polyamide polymer is preferred. To increase the hardness of the cured film, the lower limit is preferably 1 part by weight, and more preferably 5 parts by weight, and the upper limit is preferably 100 parts by weight, and more preferably 50 parts by weight.

Illustrative examples of polyol compounds include linear diols such as ethylene glycol, diethylene glycol, 1,3-propanediol, 1,4-butanediol, 1,5-pentanediol, 1,6-hexanediol, 1,7-heptanediol, 1,8-octanediol, 1,9-nonanediol and 1,10-decanediol; branched diols such as propylene glycol, neopentyl glycol, 3-methyl-1,5-pentanediol, 2,2-diethyl-1,3-propanediol, and 1,2-, 1,3- or 2,3-butanediol; diols having a cyclic group, such as cyclopentane-1,2-diol, cyclohexane-1,2-diol, cyclohexane-1,4-diol, 1,4-bis(hydroxymethyl)cyclohexane, and m- or p-xylylene glycol; divalent phenols such as bisphenol A; polyhydric alcohols such as glycerol, polyglycerol, trimethylolpropane, pentaerythritol and dipentaerythritol; sugars and their derivatives, such as sucrose, methyl glucoside and sorbitol; and polymeric polyols such as polyester polyols, polyether polyols, polycarbonate polyols and polycaprolactone polyols.

The polyol compounds may also be acquired as commercial products, illustrative examples of which include Duranol™ T6002, T6001, T5652, T5651, T5650J, T5650E, T4672, T4671, T4692, T4691, G3452 and G3450J (from Asahi Kasei Chemicals Corporation), Acrydic™ A-801-P, A-814, A-817 and A-875-55 (all from DIC Corporation), and Kuraray Polyol™ F-510 and F-1010 (from Kuraray Co., Ltd.).

The above polyol compounds may be used singly, or two or more may be used in admixture.

When a polyfunctional epoxy compound or an oxazoline compound is used as the crosslinking agent, use may be made of a photoacid generator or a photobase generator.

The photoacid generator used may be one that is suitably selected from among known photoacid generators. For example, use may be made of an onium salt derivative such as a diazonium salt, a sulfonium salt or an iodonium salt.

Illustrative examples include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di(β-hydroxyethoxy)phenylsulfonio]phenylsulfide bishexafluoroantimonate, 4,4'-bis [di(β-hydroxyethoxy)phenylsulfonio]phenylsulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

Commercial products may be used as these onium salts. Illustrative examples include San-Aid SI-60, SI-80, SI-100, SI-60L, SI-80L, SI-100L, SI-L145, SI-L150, SI-L160, SI-L110 and SI-L147 (all available from Sanshin Chemical Industry Co., Ltd.); UVI-6950, UVI-6970, UVI-6974, UVI-6990 and UVI-6992 (all available from Union Carbide); CPI-10OP, CPI-100A, CPI-200K and CPI-2005 (all available from San-Apro Ltd.); Adeka Optomer SP-150, SP-151, SP-170 and SP-171 (all available from Adeka Corporation); Irgacure 261 (BASF); CI-2481, CI-2624, CI-2639 and CI-2064 (Nippon Soda Co., Ltd.); CD-1010, CD-1011 and CD-1012 (Sartomer Company); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109 (all from Midori Kagaku Co., Ltd.); PCI-061T, PCI-062T, PCI-020T and PCI-022T (all from Nippon Kayaku Co., Ltd.); and IBPF and IBCF (Sanwa Chemical Co., Ltd.).

The photobase generator used may be one suitably selected from among known photobase generators. For example, use may be made of Co-amine complex-type, oxime carboxylic acid ester-type, carbamic acid ester-type and quaternary ammonium salt-type photobase generators.

Illustrative examples include 2-nitrobenzylcyclohexyl carbamate, triphenylmethanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl]hexane-1, 6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl) pyrrolidine, hexaamminecobalt(III) tris (triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine and 2,6-dimethyl-3,5-diacetyl-4-(2',4'-dinitrophenyl)-1,4-dihydropyridine.

A commercial product may be used as the photobase generator. Illustrative examples include TPS-OH, NBC-101 and ANC-101 (all available under these product names from Midori Kagaku Co., Ltd.).

In cases where a photoacid or photobase generator is used, the generator is used in the range of preferably 0.1 to 15 parts by weight, and more preferably 1 to 10 parts by weight, per 100 parts by weight of the polyfunctional epoxy compound.

Also, from 1 to 100 parts by weight of an epoxy resin curing agent may be optionally included per 100 parts by weight of the polyfunctional epoxy compound.

In cases where a polyfunctional (meth)acrylate compound is used, a photoradical initiator may be used.

A known photoradical initiator may be suitably selected and used for this purpose. Exemplary photoradical initiators include acetophenones, benzophenones, Michler's benzoyl benzoate, amyloxime ester, tetramethylthiuram monosulfide and thioxanthones.

Photocleavable photoradical initiators are especially preferred. Photocleavable photoradical initiators are listed on page 159 of *Saishin UV Kōka Gijutsu* [Recent UV Curing Technology] (publisher, K. Takausu; published by Gijutsu Joho Kyokai KK; 1991).

Examples of commercial photoradical initiators include those available from BASF under the trade names Irgacure 184, 369, 651, 500, 819, 907, 784, 2959, CGI1700, CGI1750, CGI1850 and CG24-61, and the trade names Darocur 1116 and 1173; that available from BASF under the trade name Lucirin TPO; that available from UCB under the trade name Ubecryl P36; and those available under the trade names Esacure KIP150, KIP65LT, KIP100F, KT37, KT55, KT046 and KIP75/B from the Fratelli Lamberti Company.

The photoradical initiator is used in the range of preferably from 0.1 to 15 parts by weight, and more preferably from 1 to 10 parts by weight, per 100 parts by weight of the polyfunctional (meth)acrylate compound.

Various solvents may be added to the film-forming composition of the invention and used to dissolve the respective hyperbranched polymers.

In such cases, the solvent may be the same as or different from the solvent used during polymerization. The solvent is not particularly limited; any one or plurality of solvents may be selected and used for this purpose, so long as compatibility with the polymers is not lost.

Illustrative examples of such solvents include toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl n-butyl ketone, cyclohexanone, ethyl acetate, isopropyl acetate, n-propyl acetate, isobutyl acetate, n-butyl acetate, ethyl lactate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide, N-methylpyrrolidone, 1,3-dimethyl-2-imidazolidinone, dimethylsulfoxide and N-cyclohexyl-2-pyrrolidinone. These may be used singly or two or more may be used in combination.

The solids concentration within the film-forming composition is not particularly limited, provided it falls within a range that does not affect the storage stability of the composition, and may be suitably set according to the target film thickness. Specifically, from the standpoint of solubility and storage stability, the solids concentration is preferably from 0.1 to 50 wt %, and more preferably from 0.1 to 40 wt %.

In addition to the respective hyperbranched polymers and the crosslinking agents and solvents that may be used if necessary, other ingredients such as leveling agents and surfactants may also be included in the film-forming composition of this invention, provided that doing so does not detract from the advantageous effects of the invention.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkylaryl ethers such as polyoxyethylene octyl phenol ether and polyoxyethylene nonyl phenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08, R-30, F-553, F-554, RS-75 and RS-72-K (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly or two or more may be used in combination. The amount of surfactant used per 100 parts by weight of the triazine ring-containing polymer is preferably from 0.0001 to 5 parts by weight, more preferably from 0.001 to 1 part by weight, and even more preferably from 0.01 to 0.5 part by weight.

These other ingredients may be added in any step during preparation of the inventive composition.

In addition, to increase the cracking resistance of the resulting cured film, the film-forming composition of the invention may additionally include an organic monomer capable of providing a linear polymer of formula (A) below.

[Chemical Formula 21]

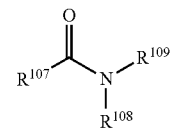

(A)

In formula (A), $R^{107}$ and $R^{109}$ are each independently a hydrogen atom, an alkyl group of 1 to 10 carbons which may have a branched structure, or a polymerizable carbon-carbon double bond-containing group; and $R^{108}$ is a hydrogen atom or an alkyl group of 1 to 10 carbons which may have a branched structure, with the proviso that either of $R^{107}$ and $R^{108}$ is a polymerizable carbon-carbon double bond-containing group but $R^{107}$ and $R^{108}$ are not both at the same time polymerizable carbon-carbon double bond-containing groups.

Of these, $R^{107}$ is preferably a hydrogen atom or a methyl group, and $R^{108}$, to ensure hydrogen bond formability with the triazine ring-containing polymer, is preferably a hydrogen atom.

Illustrative examples of the alkyl group of 1 to 10 carbons which may have a branched structure include methyl, ethyl, n-propyl, isopropyl, n-butyl, isobutyl, s-butyl, t-butyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, n-hexyl, 1-methyl-n- pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, n-heptyl, n-octyl, 2-ethylhexyl, n-nonyl and n-decyl groups.

Of these, alkyl groups of 1 to 5 carbons are preferred.

The polymerizable carbon-carbon double bond-containing group, although not particularly limited, is preferably a carbon-carbon double bond-containing hydrocarbon group (alkenyl group) having from 2 to 10 carbons, and preferably from 2 to 5 carbons. Illustrative examples include ethenyl (vinyl), n-1-propenyl, n-2-propenyl (allyl), 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-2-pentenyl, n-3-pentenyl, n-4-pentenyl, 1-n-propylethenyl, 1-methyl-1-butenyl, 1-methyl-2-butenyl, 1-methyl-3-butenyl, 2-ethyl-2-propenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1,1-dimethyl-2-propenyl, 1-i-propylethenyl, 1,2-dimethyl-1-propenyl, 1,2-dimethyl-2-propenyl, n-1-hexenyl, n-2-hexenyl, n-3-hexenyl, n-4-hexenyl, n-5-hexenyl, n-heptenyl, n-octenyl, n-noneyl and n-decenyl groups.

Illustrative examples of organic monomers of formula (A) include N-vinylformamide, N-vinylacetamide, N-allylformamide, N-allylacetamide, (meth)acrylamide, N-methyl (meth)acrylamide, N-dimethyl (meth)acrylamide, N-ethyl (meth)acrylamide, N-diisopropyl (meth)acrylamide, N-isopropyl (meth)acrylamide and N-diisopropyl (meth)acrylamide.

No particular limitation is imposed on the amount in which the organic monomer of formula (A) is used. However, to further increase the cracking resistance of the resulting cured film, this is preferably from 1 to 200 parts by weight per 100 parts by weight of the combined amount of the hyperbranched polymers. From the standpoint of the cracking resistance of the cured film, the lower limit is preferably 5 parts by weight, and more preferably 10 parts by weight, and the upper limit is preferably 150 parts by weight, and more preferably 100 parts by weight.

The other ingredients mentioned above may be added simultaneous with mixture of the hyperbranched polymers and the solvent, or may be added thereafter, without particular limitation.

The desired cured film may be formed by applying the film-forming composition of the invention onto a base material, then optionally heating to evaporate the solvent, and subsequently heating or carrying out light exposure to cure the composition.

Any suitable method may be used for applying the composition, such as spin coating, dipping, flow coating, inkjet printing, spraying, bar coating, gravure coating, slit coating, roll coating, transfer printing, brush coating, blade coating and air knife coating.

Examples of the base material include, but are not particularly limited to, silicon, indium-tin oxide (ITO)-coated glass, indium zinc oxide (IZO)-coated glass, polyethylene terephthalate (PET), plastic, glass, quartz and ceramic. Use can also be made of a flexible base material having pliability.

Baking to evaporate off the solvent is carried out at a temperature which, although not particularly limited, may be set to, for example, from 40 to 400° C.

The baking process is not particularly limited. For example, evaporation may be effected using a hot plate or an oven, such evaporation being carried out under a suitable atmosphere, such as in open air, in nitrogen or another inert gas, or in a vacuum.

With regard to the bake temperature and time, conditions which are compatible with the processing steps for the target electronic device should be selected. The bake conditions should be selected in such a way that the physical values of the resulting film conform to the required characteristics of the electronic device.

The conditions in cases where exposure to light is carried out are also not particularly limited. For example, the exposure energy and time should be ones that are suitable for the crosslinkable groups and crosslinking agent that are used.

Because the cured film of the invention that has been thus obtained is able to achieve a high heat resistance, high transparency, high refractive index, high solubility and low volume shrinkage, it can be advantageously used as a component in the fabrication of electronic devices such as liquid-crystal displays, organic EL displays, optical semiconductor devices (LEDs), solid-state image sensors, organic thin-film solar cells, dye-sensitized solar cells and organic thin-film transistors. In particular, because the cured film is resistant to cracking even when produced as a thick-film, such cured films can be advantageously used as the following solid-state image sensor components: embedding films and planarizing films on photodiodes, planarizing films before and after color filters, microlenses, and planarizing films and conformal films on microlenses.

EXAMPLES

Synthesis Examples and Working Examples are given below to more fully illustrate the invention, although the invention is not limited by these Examples. The instruments, etc. used for measurement in the Examples were as follows.
(1) Gel Permeation Chromatography (GPC)
 [Condition A]
 Instrument: SCL-10Avp
  (Shimadzu Corporation, modified for GPC)
 Columns: Shodex® K-804L+K-805L (Showa Denko K.K.)
 Column temperature: 60° C.
 Solvent: N-Methyl-2-pyrrolidone (with 1% LiCl added)
 Detector: UV (254 nm)
 Calibration curve: Polystyrene standard
 [Condition B]
 Instrument: HLC-8200 GPC (Tosoh Corporation)
 Columns: Shodex® GPC KF-804L+KF-805L
  (Showa Denko K.K.)
 Column temperature: 40° C.
 Solvent: THF
 Detector: UV (254 nm)
 Calibration curve: Polystyrene standard
(2) $^1$H-NMR Spectrum
 Instrument: JNM-ECA700 (JEOL Datum)
 Solvent: DMSO-$d_6$
 Internal standard: Tetramethylsilane
(3) Total Light Transmittance, Haze
 Instrument: NDH 5000
  (Nippon Denshoku Industries Co., Ltd.)
(4) Refractive Index
 Instrument: VASE multiple incident angle spectroscopic ellipsometer (JA Woollam Japan)
(5) Ultraviolet/Visible/Near-Infrared Spectrophotometer
 Instrument: UV-3600 (Shimadzu Corporation)

(6) Thermogravimetric/Differential Thermal Analyzer (TG-DTA)
  Instrument: TG-8120 (Rigaku Corporation)
  Temperature ramp-up rate: 10° C./min
  Measurement temperatures: 20° C. to 500° C.
(7) DSC
  Instrument: DSC 204F1 Phoenix (Netzsch)
  Temperature ramp-up rate: 30° C./min
  Measurement temperatures: 25° C. to 300° C.
(8) Pencil Hardness
  Instrument: No. 553-M Film Hardness Tester by Means of Pencils (Yasuda Seiki Seisakusho, Ltd.)
  Measurement Method:
    In accordance with JIS-K5600-5-4, a pencil was pressed against the surface of the thin-film at an angle of 45°, under a load of 750 g and over a distance of 7 mm. Measurement was carried out by successively increasing the hardness of the pencil until an indentation formed in the film.
(9) Film Thickness
  Instrument: Dektak 3 Stylus Surface Profiler (Ulvac, Inc.)

[1] Synthesis of Triazine Ring-Containing Hyperbranched Polymer

[Synthesis Example 1] Synthesis of HB-TmDA

[Chemical Formula 22]

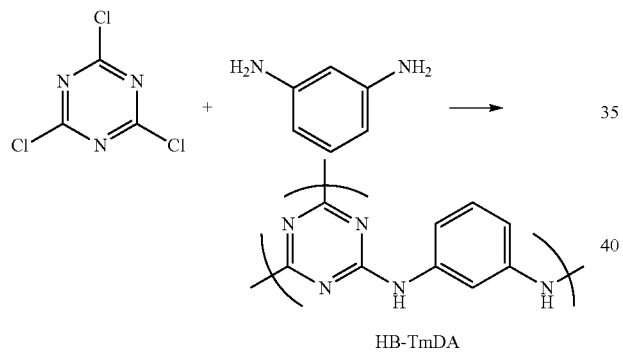

HB-TmDA

Under nitrogen, 456.02 g of DMAc was added to a 1,000 mL four-neck flask and cooled to −10° C. in an acetone-dry ice bath, following which 84.83 g (0.460 mol) of 2,4,6-trichloro-1,3,5-triazine (Evonik Degussa) was added and dissolved therein. Next, a solution of 62.18 g (0.575 mol) of m-phenylenediamine dissolved in 304.01 g of DMAc and 14.57 g (0.156 mol) of aniline were added dropwise. After dropwise addition, the flask contents were stirred for 30 minutes, then the reaction mixture was added dropwise over a period of 1 hour using a fluid transfer pump to a reactor consisting of a 2,000 mL four-neck flask to which had been added 621.85 g of DMAc and which had been heated beforehand to 85° C. on an oil bath. Following addition of the reaction mixture, stirring was carried out for 1 hour, effecting polymerization.

Next, 113.95 g (1.224 mol) of aniline was added and the flask contents were stirred for 1 hour, bringing the reaction to completion. The system was cooled to room temperature in an ice bath, after which 116.36 g (1.15 mol) of triethylamine was added dropwise and 30 minutes of stirring was carried out, thereby quenching the hydrochloric acid. The hydrochloride that settled out was then removed by filtration. The filtered reaction mixture was reprecipitated in a mixed solution of 28% ammonia water (279.29 g) and 8,820 g of deionized water. The precipitate was filtered, dried in a vacuum desiccator at 150° C. for 8 hours, then redissolved in 833.1 g of THF and reprecipitated in 6,665 g of deionized water. The resulting precipitate was filtered, then dried in a vacuum desiccator at 150° C. for 25 hours, yielding 118.0 g of the target polymeric compound [3] (referred to below as "HB-TmDA").

FIG. 1 shows the measured $^1$H-NMR spectrum for HB-TmDA. The polystyrene-equivalent weight-average molecular weight Mw of HB-TmDA, as measured by GPC (using THF as the solvent), was 4,300, and the polydispersity Mw/Mn was 3.44.

(1) Heat Resistance Test

TG-DTA measurement was carried out on the HB-TmDA obtained in Synthesis Example 1, whereupon the 5% weight loss temperature was 419° C.

(2) Measurement of Refractive Index

The HB-TmDA obtained in Synthesis Example 1 (0.5 g) was dissolved in 4.5 g of cyclohexanone, giving a clear, light yellow-colored solution. Using a spin coater, the resulting polymer varnish was spin-coated onto a glass substrate at 200 rpm for 5 seconds and at 2,000 rpm for 30 seconds, following which the solvent was removed by heating at 150° C. for 1 minute and at 250° C. for 5 minutes, thereby giving a film. Upon measurement, the resulting film was found to have a refractive index at 550 nm of 1.790.

[2] Synthesis of Tricarbonylbenzene-Based Hyperbranched Polymer

[Synthesis Example 2] Synthesis of HPmDA-Acry

[Chemical Formula 23]

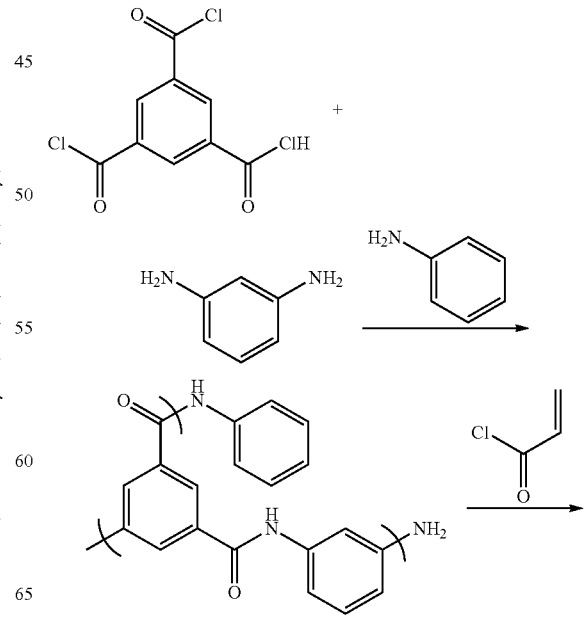

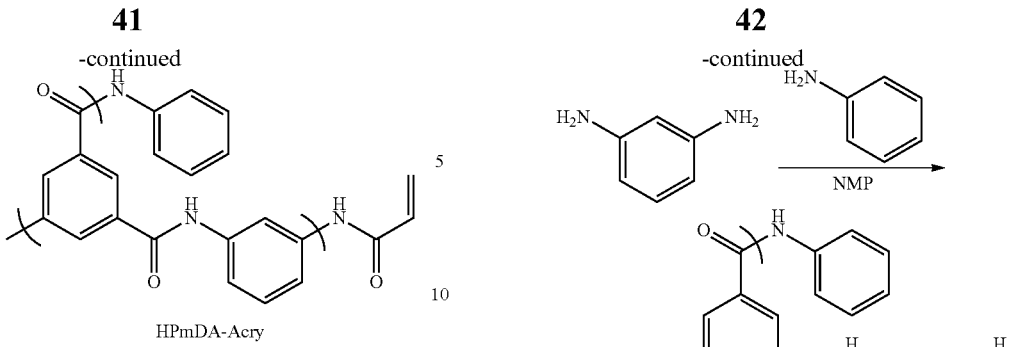

HPmDA-Acry

Figure 2:
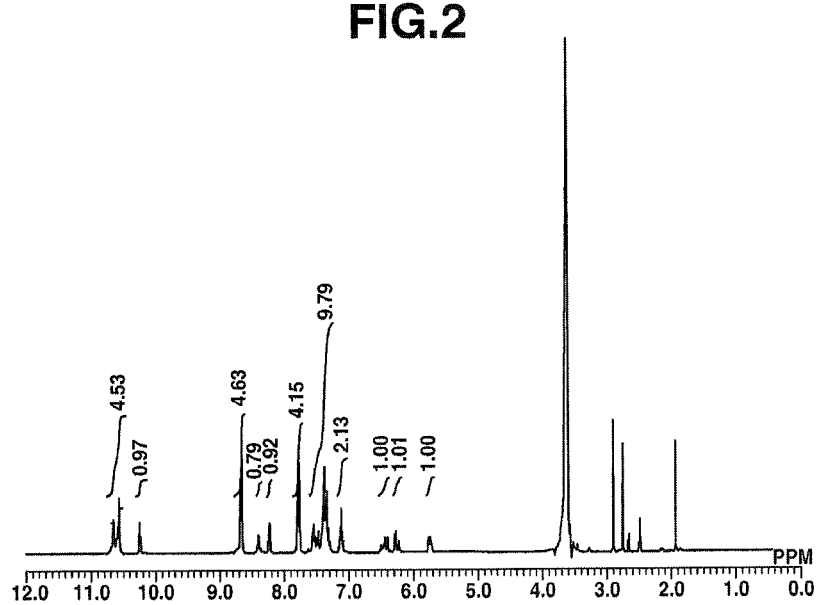
FIG. 2 is an $^1$H-NMR spectrum of the aromatic polyamide-based hyperbranched polymer obtained in Synthesis Example 2.

In a nitrogen atmosphere, a 1,000 mL four-neck flask was charged with 20.37 g (188.3 mmol) of 1,3-phenylenediamine (DuPont K.K.), 28.06 g (301.3 mmol) of aniline (Junsei Chemical Co., Ltd.) and 250.4 g of N-methyl-2-pyrrolidone (Junsei Chemical Co., Ltd.), and the system was cooled to 5° C. Separately, in a nitrogen atmosphere and within a 500 mL four-neck flask, 1,3,5-benzenetricarbonyl trichloride (40 g, 150.7 mmol, from Wako Pure Chemical Industries, Ltd.) was dissolved in N-methyl-2-pyrrolidone (250.4 g; Junsei Chemical Co., Ltd.). The solution was cooled to −20° C. and then added dropwise over 30 minutes to the above amine solution at an internal temperature of 5 to 10° C., thereby effecting polymerization. Following dropwise addition, the system was stirred at 10° C. or below for 1 hour. To this was then dropwise added 27.27 g (301.3 mmol) of acryloyl chloride (Tokyo Chemical Industry) at an internal temperature of 5 to 10° C. over a period of 20 minutes, and the system was stirred at 45° C. for 2 hours. The reaction mixture was added to 2,000 g of pure water and reprecipitated, and the resulting precipitate was filtered and dried in a vacuum desiccator at 150° C. for 3 hours. The resulting wet product was again dissolved in 240 g of DMAc and stirred at 45° C. for 1 hour. Next, the DMAc solution was allowed to cool to 30° C., then added to 2,000 g of pure water to effect re-precipitation. The resulting precipitate was collected by filtration, then dried in a vacuum desiccator at 150° C. for 10 hours, giving 52.7 g of the target tricarbonylbenzene-based highly branched polymer (abbreviated below as "HPmDA-Acry"). FIG. 2 shows the $^1$H-NMR spectrum obtained for HPmDA-Acry.

The weight-average molecular weight Mw of HPmDA-Acry, as measured by GPC (solvent, NMP) against a polystyrene standard, was 8,275, and the polydispersity Mw/Mn was 2.36.

[Thermal Analysis of Polymer]

The glass transition temperature (Tg) of HPmDA-Acry was measured by differential scanning calorimetry (DSC) and the 5% weight loss temperature ($Td_{5\%}$) was measured by TG-DTA, whereupon the Tg was 137.4° C. and the $Td_{5\%}$ was 374.9° C.

[Synthesis Example 3] Synthesis of HPmDA

[Chemical Formula 24]

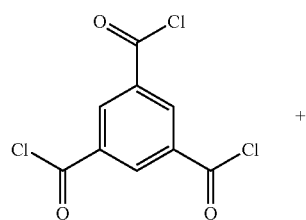

+

HPmDA

Figure 3:
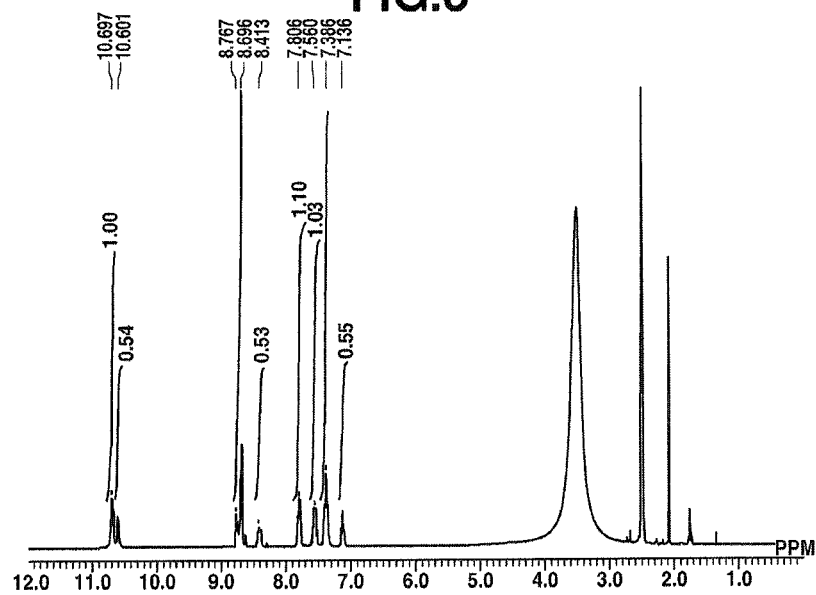
FIG. 3 is an $^1$H-NMR spectrum of the aromatic polyamide-based hyperbranched polymer obtained in Synthesis Example 3.

In a nitrogen atmosphere, a 50 mL four-neck flask was charged with 3 g (11.3 mmol) of 1,3,5-benzenetricarbonyl trichloride (Tokyo Chemical Industry) and 13.3 g of N-methyl-2-pyrrolidone (Junsei Chemical Co., Ltd.), following which a solution of 0.92 g (8.48 mmol) of 1,3-phenylenediamine (DuPont K.K.) and 0.79 g (8.48 mmol) of aniline (Junsei Chemical Co., Ltd.) in 13.3 g of N-methy-2-pyrrolidone (Junsei Chemical Co., Ltd.) was added dropwise over a period of 30 minutes at an internal temperature of 12° C. and polymerization was carried out. Following the completion of dropwise addition, the flask contents were stirred for 30 minutes at room temperature, pure water (3 g) was added dropwise, followed by another 30 minutes of stirring, after which the reaction mixture was added to 450 g of pure water, thereby effecting re-precipitation. The resulting precipitate was collected by filtration, then again dissolved in a mixed solvent of 24 g of THF (Kanto Chemical Co., Ltd.) and 1.8 g of pure water, after which the solution was added to 450 g of pure water, thereby effecting re-precipitation. The resulting precipitate was collected by filtration and dried at 150° C. for 2 hours in a vacuum desiccator, giving 3.3 g of the target tricarbonylbenzene-based hyperbranched polymer (abbreviated below as "HPmDA"). FIG. 3 shows the $^1$H-NMR spectrum obtained for HPmDA.

The weight-average molecular weight Mw of HPmDA, as measured by GPC (solvent, NMP) against a polystyrene standard, was 12,600, and the polydispersity Mw/Mn was 2.38.

[3] Curable Compositions and Production of Films Therefrom

Example 1

(1) Preparation of Photocurable Composition

In an air atmosphere, 0.4000 g of the triazine-based hyperbranched polymer HB-TmDA obtained in Synthesis Example 1 and 0.6000 g of the tricarbonylbenzene-based hyperbranched polymer HPmDA-Acry obtained in Synthesis Example 2 were added to a 10 mL sample vial, then 4.0000 g of a mixed solvent of cyclohexanone and pure water (in the weight ratio CYH/$H_2O$=96/4) was added thereto as the solvent, and stirring was carried out with a mixing rotor (110 rpm) at room temperature for 1 hour until dissolution was complete and the solution became uniform. After stirring, a polymer varnish having a total solids content of 20 wt % was obtained as a clear, light yellow-colored solution in which the polymer was completely dissolved.

Next, 0.564 g of a mixed solvent of cyclohexanone and pure water (in the weight ratio CYH/H$_2$O=96/4) was added to 5.0000 g of this 20 wt % polymer varnish. To this was added 0.333 g (20.0 parts by weight per 100 parts by weight of the polymer solids) of a solution of the polyfunctional acrylate crosslinking agent A-DPH-12E (Shin-Nakamura Chemical Co., Ltd.) diluted to a solids concentration of 60 wt % with a mixed solvent of cyclohexanone and pure water (in the weight ratio CYH/H$_2$O=96/4). To this was further added 0.050 g (0.05 part by weight per 100 parts by weight of the polymer solids) of a solution of the leveling agent Megafac F-444 (DIC Corporation) diluted to a solids concentration of 1 wt % with a mixed solvent of cyclohexanone and pure water (in the weight ratio CYH/H$_2$O=96/4). Last of all, 1.000 g (5.00 parts by weight per 100 parts by weight of the polymer solids) of a solution of the photoradical initiator Irgacure 184 (BASF) diluted to a solids concentration of 5 wt % with a mixed solvent of cyclohexanone and pure water (in the weight ratio CYH/H$_2$O=96/4) was added. These were stirred until the solutes completely dissolved and the solution became uniform, thereby giving a polymer varnish having a total solids content of 18 wt % (abbreviated below as "HBP-12E").

(2) Production of Film

The polymer varnish prepared above was spin-coated onto a quartz substrate with a spin coater at 1,000 rpm for 30 seconds, dried for 3 minutes in open air on a 130° C. hot plate, then UV-cured at a cumulative exposure dose of 800 mJ/cm$^2$ in open air, giving a thin-film (film thickness, 1,109.8 nm).

Example 2

(1) Preparation of Heat-Curable Composition

In an air atmosphere, 2.0000 g of the triazine-based hyperbranched polymer HB-TmDA obtained in Synthesis Example 1 and 3.0000 g of the tricarbonylbenzene-based hyperbranched polymer HPmDA obtained in Synthesis Example 3 were added to a 30 mL sample vial, then 20.000 g of a mixed solvent of cyclohexanone and DMAc (in the weight ratio CYH/DMAc=4/1) was added thereto as the solvent and stirring under applied heat was carried out at 60° C. for 1 hour until dissolution was complete and the solution became uniform. After stirring, a polymer varnish having a total solids content of 20 wt % was obtained as a clear, light yellow-colored solution in which the polymer was completely dissolved. Next, 0.7525 g of a mixed solvent of cyclohexanone and DMAc (in the weight ratio CYH/DMAc=4/1) was added to 5.0000 g of this 20 wt % polymer varnish. To this was added 0.200 g (20.0 parts by weight per 100 parts by weight of the polymer solids) of the aminoplast crosslinking agent Cymel 303 (Nihon Cytec Industries, Inc.). To this was further added 0.050 g (0.05 part by weight per 100 parts by weight of the polymer solids) of a solution of the leveling agent Megafac F-444 (DIC Corporation) diluted to a solids concentration of 1 wt % with a mixed solvent of cyclohexanone and DMAc (in the weight ratio CYH/DMAc=4/1). These were stirred until the solutes completely dissolved and the solution became uniform, thereby giving a polymer varnish having a total solids content of 20 wt % (abbreviated below as "HBP-Cy").

(2) Production of Film

The polymer varnish prepared above was spin-coated onto a quartz substrate with a spin coater at 1,500 rpm for 30 seconds, dried for 1 minute in open air on a 150° C. hot plate, then heat-cured for 5 minutes on a 200° C. hot plate, giving a thin-film (film thickness, 1,098.9 nm).

<Solvent Resistance Test>

The thicknesses of the thin-films obtained above were treated as the respective initial film thicknesses, and solvent resistance tests were carried out by the following method.

The thin-film obtained in Example 1 was completely immersed for 1 minute in a mixed solvent of cyclohexanone and pure water (in the weight ratio CYH/H$_2$O=96/4) as the varnish solvent. Next, the thin-film was dried in air, and then baked for 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 99.8%, indicating a high solvent resistance.

The thin-film obtained in Example 2 was completely immersed for 1 minute in a mixed solvent of cyclohexanone and DMAc (in the weight ratio CYH/DMAc=4/1) as the varnish solvent. Next, the thin-film was dried in air, and then baked for 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 100.1%, indicating a high solvent resistance.

<Measurement of Film Refractive Index, Total Light Transmittance and Haze>

The refractive index, total light transmittance and haze of each of the thin-films obtained above were measured. The results are presented in Table 1. As shown in Table 1, for all of the compositions to which a crosslinking agent was added, the resulting films had a refractive index of 1.7 or more, which is high, and also had a good transparency.

TABLE 1

| Type of polymer | Total light transmittance (%) | Haze (%) | Refractive index at 589 nm | Refractive index at 633 nm |
|---|---|---|---|---|
| Example 1 HB-TmDA HPmDA-Acry | 97.2 | 0.1 | 1.7132 | 1.7053 |
| Example 2 HB-TmDA HPmDA | 97.3 | 0.04 | 1.7373 | 1.7292 |

<Pencil Hardness Test>

The pencil hardnesses of the thin-films obtained above were measured. The measurement results for each of the thin-films were a pencil hardness of F. It is thus apparent that by reacting an aromatic polyamide-based hyperbranched polymer with a triazine ring-containing hyperbranched polymer and a crosslinking agent, thin-films of a relatively high hardness can be obtained.

<Heat-Resistance Test>

The polymer varnish HBP-12E prepared in Example 1 was spin-coated onto a quartz substrate with a spin coater at 1,000 rpm for 30 seconds and subsequently dried for 3 minutes in open air on a 130° C. hot plate, then UV-cured at a cumulative exposure dose of 800 mJ/cm$^2$ in open air, thereby giving a thin-film. The resulting thin-film was baked in air for 10 minutes on a 270° C. hot plate, and the transmittances before and after baking were measured to evaluate the heat resistance. The results are shown in Table 4.

The polymer varnish HBP-Cy prepared in Example 2 was spin-coated onto a quartz substrate with a spin coater at 1,500 rpm for 30 seconds and subsequently dried for 1 minute in open air on a 150° C. hot plate, then heat-cured for 5 minutes on a 200° C. hot plate, thereby giving a thin-film. The resulting thin-film was baked in air for 10 minutes on a 270° C. hot plate, and the transmittances before and after baking were measured to evaluate the heat resistance. The results are shown in Table 5.

Figure 4:
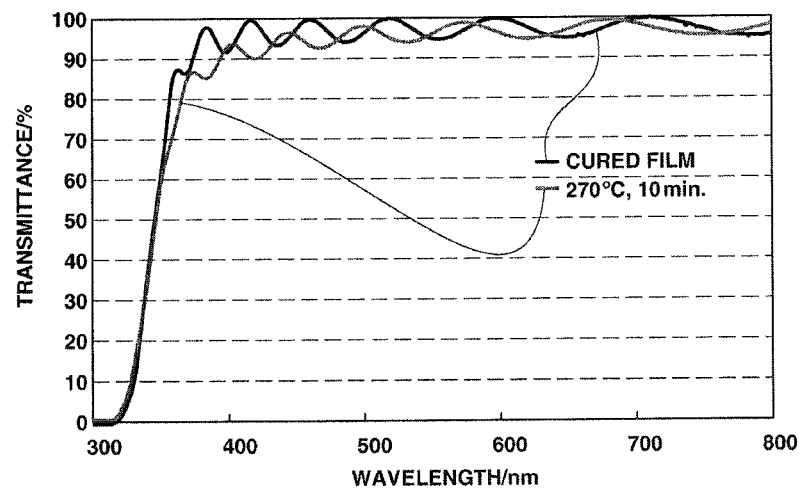
FIG. 4 is a graph showing the transmittance of the thin-film produced in Example 1, both before and after a heat-resistance test.
Figure 5:
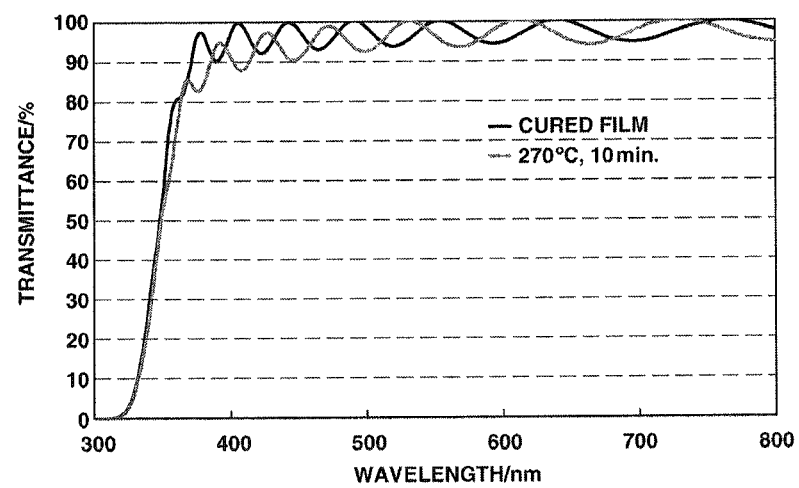
FIG. 5 is a graph showing the transmittance of the thin-film produced in Example 2, both before and after a heat-resistance test.

As shown in FIGS. 4 and 5, even when baked at an elevated temperature of 270° C., the transmittance in the visible region (400 to 800 nm) remained at 90% or more, indicating that the films had a high heat-yellowing resistance.

<Acid and Alkali Resistance Tests>

The polymer varnish HBP-12E prepared in Example 1 was spin-coated onto a quartz substrate with a spin coater at 1,000 rpm for 30 seconds and subsequently dried for 3 minutes in open air on a 130° C. hot plate, then UV-cured at a cumulative exposure dose of 800 mJ/cm² in open air, thereby giving a thin-film (film thickness, 1,109.8 nm).

The polymer varnish HBP-Cy prepared in Example 2 was spin-coated onto a quartz substrate with a spin coater at 1,500 rpm for 30 seconds and subsequently dried for 1 minute in open air on a 150° C. hot plate, then heat-cured for 5 minutes on a 200° C. hot plate, thereby giving a thin-film (film thickness, 1,100.1 nm).

Treating the thickness of these respective thin-films as the initial film thicknesses, solvent resistance tests were carried out by the following method.

These thin-films were each immersed for 5 minutes in 5% or 10% aqueous HCl and in 5% or 10% aqueous NaOH. The films were then washed with pure water and air-dried, following which they were dried for 1 minute on a hot plate heated to 150° C., after which the film thicknesses were measured and compared with the initial film thickness. The residual film ratios, relative to an initial film thickness of 100%, are shown in Table 2. The residual film ratios of the thin-films thus obtained were each high at 99% or more, indicating the thin-films had high acid and alkali resistances.

TABLE 2

| Type of varnish | | Residual film ratio (%) | | | |
|---|---|---|---|---|---|
| | | 5% HCl Aq. | 10% HCl Aq. | 5% NaOH Aq. | 10% NaOH Aq. |
| Example 1 | HBP-12E | 99.9 | 100.0 | 99.5 | 99.1 |
| Example 2 | HBP-Cy | 100.2 | 100.6 | 100.9 | 101.9 |

The invention claimed is:

1. A film-forming composition characterized by comprising a triazine ring-containing hyperbranched polymer which includes a recurring unit structure of formula (1) below and an aromatic polyamide-based hyperbranched polymer which includes a recurring unit structure of formula (2) below

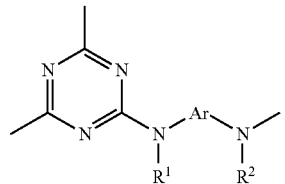

(1)

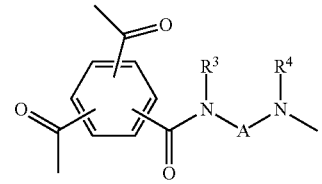

(2)

wherein $R^1$ to $R^4$ are each independently a hydrogen atom, an alkyl group, an alkoxy group, an aryl group or an aralkyl group, Ar is at least one moiety selected from the group consisting of moieties of formulas (3) to (14) and A is at least one moiety selected from the group consisting of moieties of formulas (3) to (27)

[Chemical Formula 2]

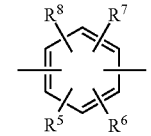

(3)

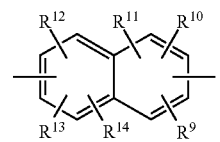

(4)

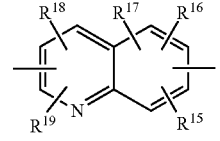

(5)

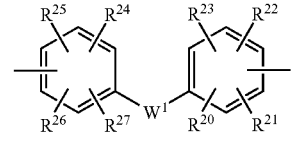

(6)

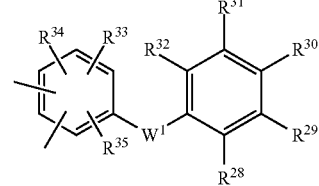

(7)

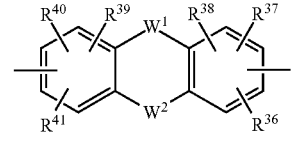

(8)

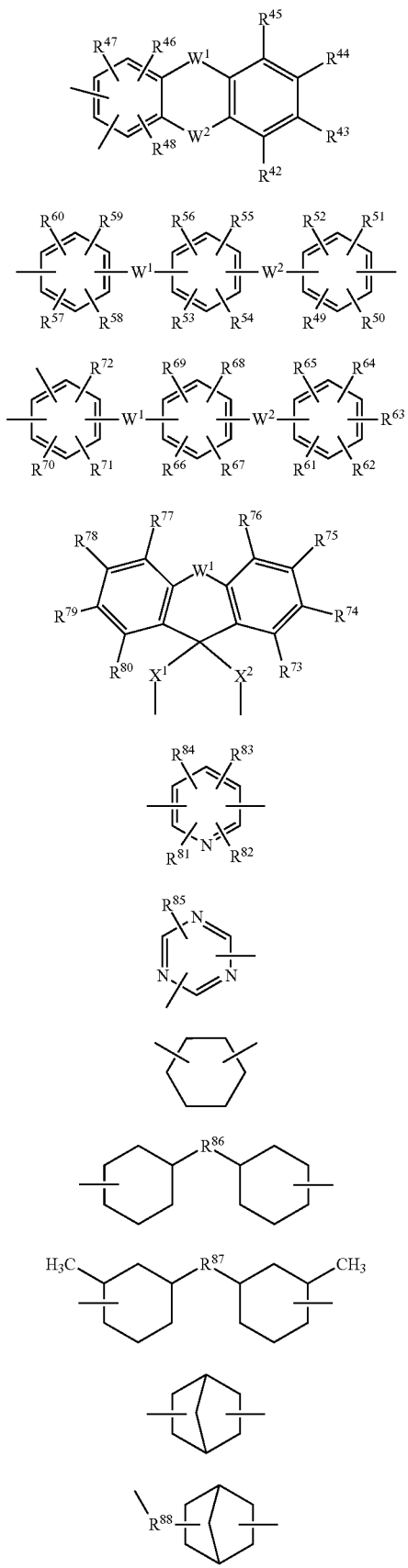
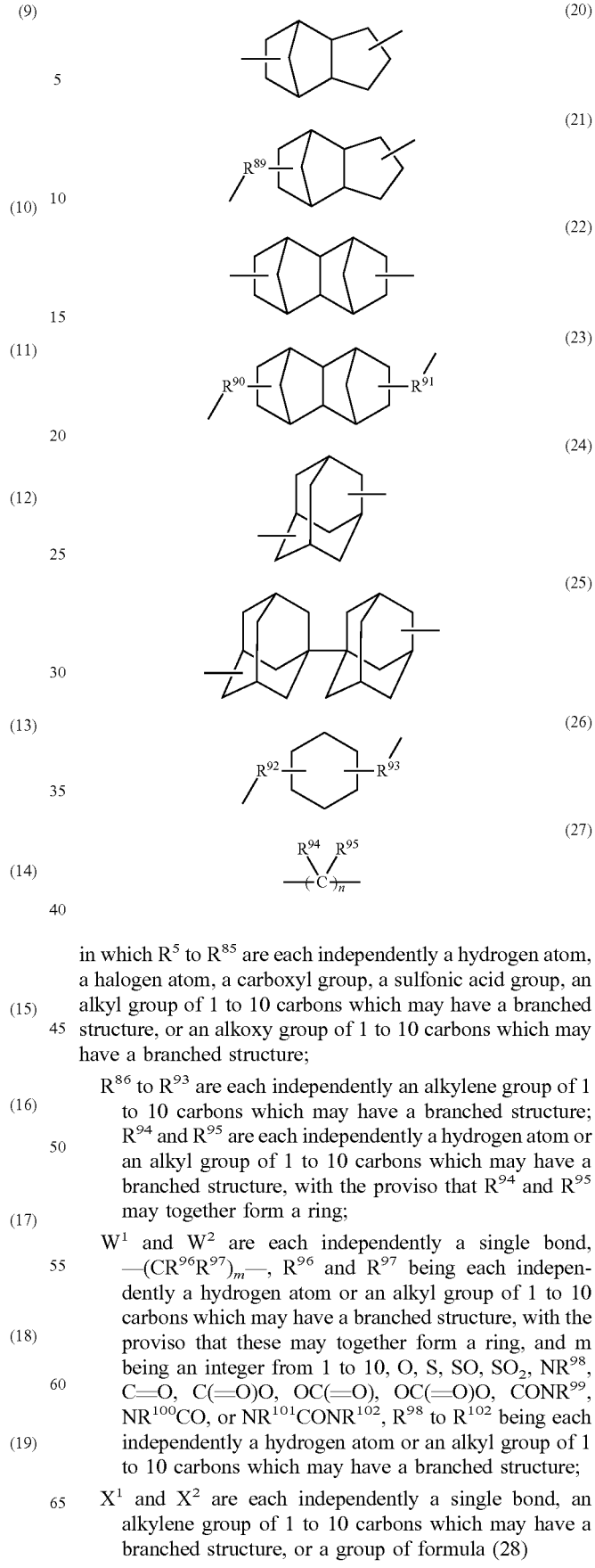

in which $R^5$ to $R^{85}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure;

$R^{86}$ to $R^{93}$ are each independently an alkylene group of 1 to 10 carbons which may have a branched structure; $R^{94}$ and $R^{95}$ are each independently a hydrogen atom or an alkyl group of 1 to 10 carbons which may have a branched structure, with the proviso that $R^{94}$ and $R^{95}$ may together form a ring;

$W^1$ and $W^2$ are each independently a single bond, $-(CR^{96}R^{97})_m-$, $R^{96}$ and $R^{97}$ being each independently a hydrogen atom or an alkyl group of 1 to 10 carbons which may have a branched structure, with the proviso that these may together form a ring, and m being an integer from 1 to 10, O, S, SO, $SO_2$, $NR^{98}$, C=O, C(=O)O, OC(=O), OC(=O)O, $CONR^{99}$, $NR^{100}CO$, or $NR^{101}CONR^{102}$, $R^{98}$ to $R^{102}$ being each independently a hydrogen atom or an alkyl group of 1 to 10 carbons which may have a branched structure;

$X^1$ and $X^2$ are each independently a single bond, an alkylene group of 1 to 10 carbons which may have a branched structure, or a group of formula (28)

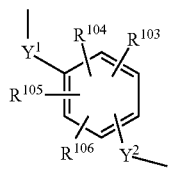
(28)

wherein $R^{103}$ to $R^{106}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure; and n is an integer from 1 to 20, wherein the aromatic polyamide-based hyperbranched polymer is obtained by reacting a benzenetricarboxylic acid or a derivative thereof with a diamine compound in the presence of at least a monofunctional substance having one functional group capable of reacting with the benzenetricarboxylic acid or a derivative thereof.

2. The film-forming composition according to claim 1, wherein the triazine ring-containing hyperbranched polymer and the aromatic polyamide-based hyperbranched polymer are included in proportions of, expressed as the weight ratio (triazine ring-containing hyperbranched polymer):(aromatic polyamide-based hyperbranched polymer), of from 2:8 to 4:6.

3. The film-forming composition according to claim 1 or 2, wherein a benzenetricarboxylic acid end or a diamine end of the aromatic polyamide-based hyperbranched polymer is capped with an end-capping compound having a crosslinkable group.

4. The film-forming composition according to claim 3, wherein the aromatic polyamide-based hyperbranched polymer is obtained by reacting a benzenetricarboxylic acid or a derivative thereof with a diamine compound in the presence of a monofunctional substance having one functional group capable of reacting with the benzenetricarboxylic acid or a derivative thereof, and by additional reaction in the presence of an end-capping compound having a functional group capable of reacting with an end that originates from the diamine and having also a crosslinkable group.

5. The film-forming composition according to claim 4, wherein the end-capping compound is a compound having a carboxyl group or a derivative group thereof and a carbon-carbon double bond.

6. The film-forming composition according to claim 5, wherein the end-capping compound is (meth)acrylic acid or a derivative thereof.

7. The film-forming composition according to claim 1, wherein the monofunctional substance is aniline, phenol or methanol.

8. The film-forming composition according to claim 1, wherein Ar is at least one moiety selected from the group consisting of moieties of formulas (3), (6), (8), (9) and (12).

9. The film-forming composition according claim 1, wherein A is at least one moiety selected from the group consisting of moieties of formulas (3), (6), (7), (8), (12), (14) and (27).

10. The film-forming composition according to claim 1 which further comprises a crosslinking agent.

11. The film-forming composition according to claim 10, wherein the crosslinking agent is a compound having a (meth)acryl group.

12. The film-forming composition according to claim 11, wherein the crosslinking agent is a polyfunctional (meth)acrylate compound.

13. The film-forming composition according to claim 10, wherein the crosslinking agent is an aminoplast compound.

14. The film-forming composition according to claim 1, wherein the triazine ring-containing hyperbranched polymer comprises HB-TmDA and the aromatic polyamide-based hyperbranched polymer comprises HPmDA, with HB-TmDA and HPmDA having recurring unit structures as follows:

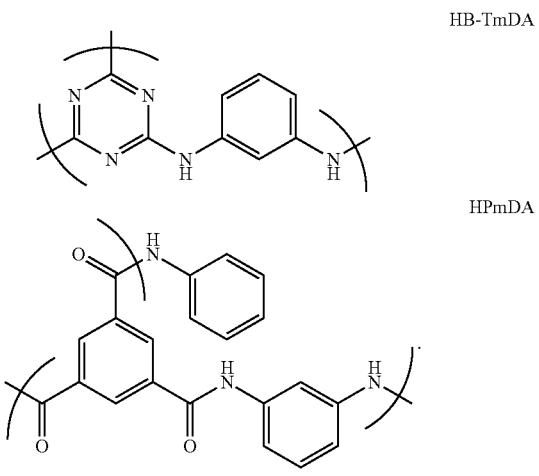

15. A cured film obtained by curing a film-forming composition comprising a triazine ring-containing hyperbranched polymer which includes a recurring unit structure of formula (1) below and an aromatic polyamide-based hyperbranched polymer which includes a recurring unit structure of formula (2) below

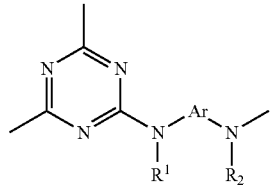
(1)

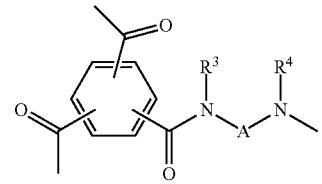
(2)

wherein $R^1$ to $R^4$ are each independently a hydrogen atom, an alkyl group, an alkoxy group, an aryl group or an aralkyl group, Ar is at least one moiety selected from the group consisting of moieties of formulas (3) to (14) and A is at least one moiety selected from the group consisting of moieties of formulas (3) to (27)

[Chemical Formula 2]
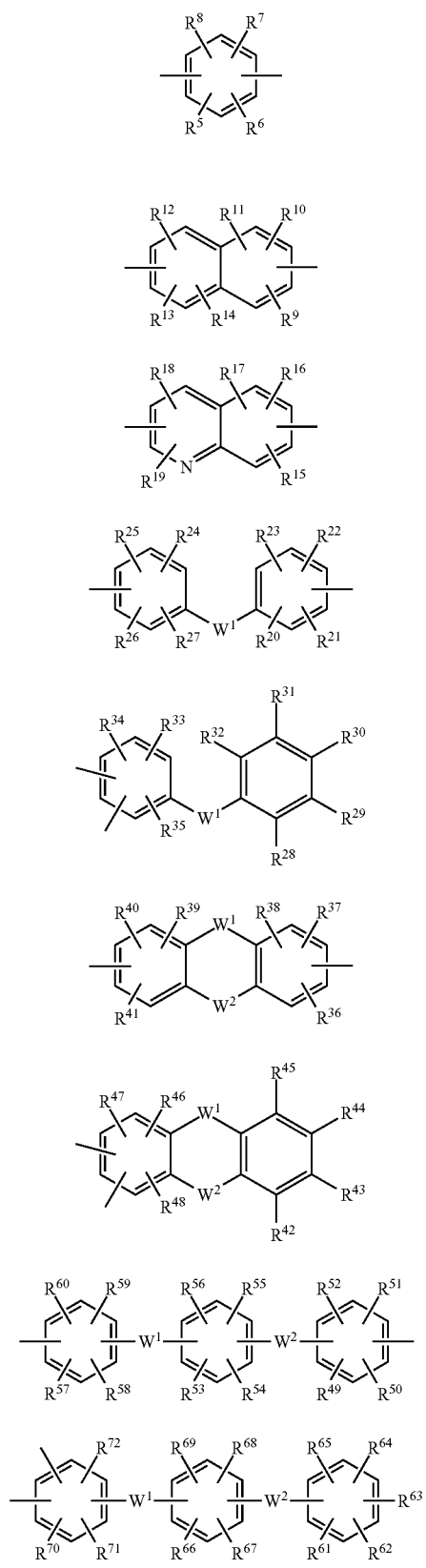
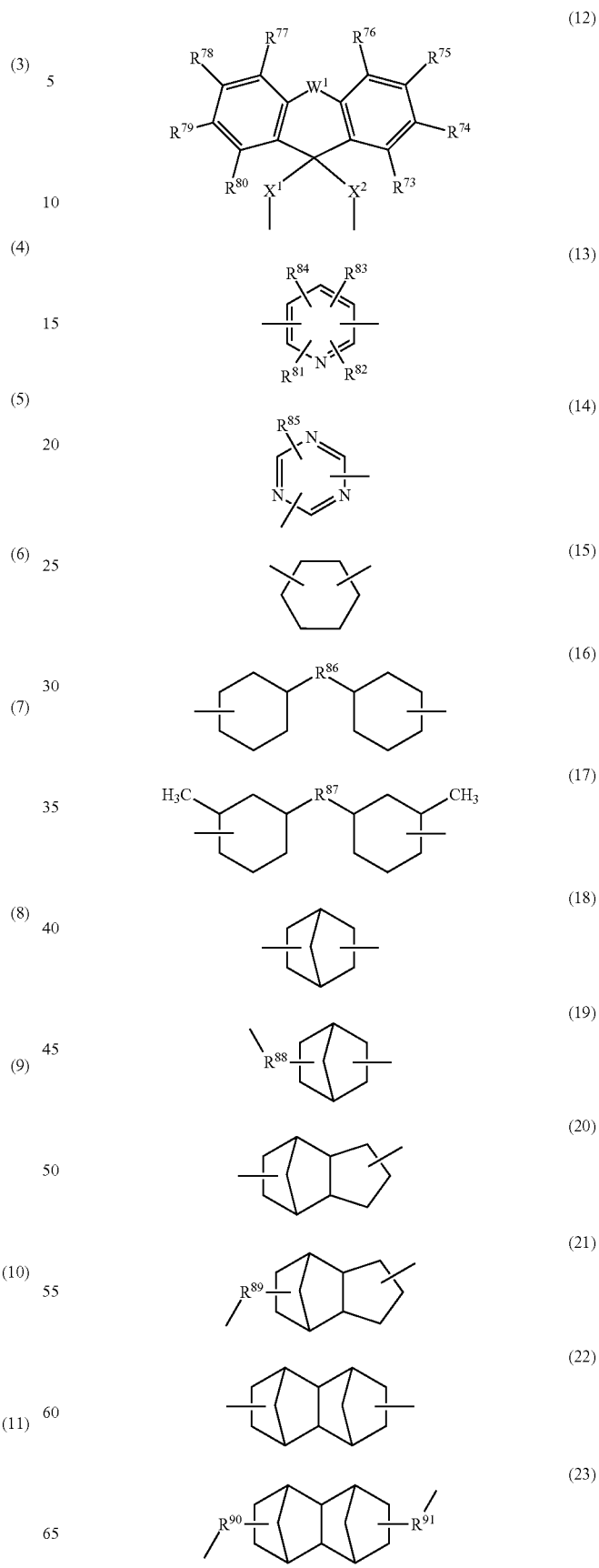

(24)

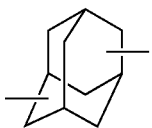

(25)

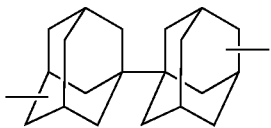

(26)

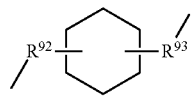

(27)

in which $R^5$ to $R^{85}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure;

$R^{86}$ to $R^{93}$ are each independently an alkylene group of 1 to 10 carbons which may have a branched structure; $R^{94}$ and $R^{95}$ are each independently a hydrogen atom or an alkyl group of 1 to 10 carbons which may have a branched structure, with the proviso that $R^{94}$ and $R^{95}$ may together form a ring;

$W^1$ and $W^2$ are each independently a single bond, —$(CR^{96}R^{97})_m$—, $R^{96}$ and $R^{97}$ being each independently a hydrogen atom or an alkyl group of 1 to 10 carbons which may have a branched structure, with the proviso that these may together form a ring, and m being an integer from 1 to 10, O, S, SO, $SO_2$, $NR^{98}$, C=O, C(=O)O, OC(=O), OC(=O)O, $CONR^{99}$, $NR^{100}CO$, or $NR^{101}CONR^{102}$, $R^{98}$ to $R^{102}$ being each independently a hydrogen atom or an alkyl group of 1 to 10 carbons which may have a branched structure;

$X^1$ and $X^2$ are each independently a single bond, an alkylene group of 1 to 10 carbons which may have a branched structure, or a group of formula (28)

(28)

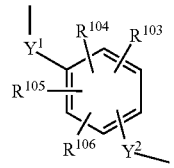

wherein $R^{103}$ to $R^{106}$ are each independently a hydrogen atom, a halogen atom, a carboxyl group, a sulfonic acid group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure; and n is an integer from 1 to 20, wherein the aromatic polyamide-based hyperbranched polymer is obtained by reacting a benzenetricarboxylic acid or a derivative thereof with a diamine compound in the presence of at least a monofunctional substance having one functional group capable of reacting with the benzenetricarboxylic acid or a derivative thereof.

16. A film having high refractive index, said film comprising a base material and the cured film of claim 15 formed on the base material.

17. An electronic device comprising a base material and the cured film of claim 15 formed on the base material.

18. An optical member comprising a base material and the cured film of claim 15 formed on the base material.

* * * * *